(12) United States Patent
Bock

(10) Patent No.: US 6,702,244 B2
(45) Date of Patent: Mar. 9, 2004

(54) STABILIZATION MECHANISM FOR CYLINDERICALLY SHAPED OBJECTS

(76) Inventor: Eddie Bruce Bock, 9114 Seagrove Dr., Dallas, TX (US) 75243

(*) Notice: Subject to any disclaimer, the term of this patent is extended or adjusted under 35 U.S.C. 154(b) by 155 days.

(21) Appl. No.: 09/741,948

(22) Filed: Dec. 20, 2000

(65) Prior Publication Data

US 2002/0109322 A1 Aug. 15, 2002

(51) Int. Cl.⁷ .................................................. A47F 5/00
(52) U.S. Cl. ............... 248/314; 248/311.2; 248/346.07; 248/346.11; 248/146; 248/188.7
(58) Field of Search .................................. 248/314, 519, 248/523, 105, 346.07, 346.11, 79.11, 311.2, 346.5, 351, 146, 188.7, 188.8; 220/737, 582, 630, 633, 660; 206/0.6, 0.7; 128/201.27, 205.22, 204.18

(56) References Cited

U.S. PATENT DOCUMENTS

| | | | | |
|---|---|---|---|---|
| 461,944 A | * | 10/1891 | Stewart | 248/314 |
| 2,434,655 A | * | 1/1948 | Homer | 294/169 |
| 2,482,704 A | * | 9/1949 | Colflesh, III | 248/346.07 |
| 3,144,232 A | * | 8/1964 | Smootz | 248/314 |
| 3,240,407 A | * | 3/1966 | Boak | 224/42.38 |
| 3,310,270 A | * | 3/1967 | Ciancio | 248/210 |
| 3,773,287 A | * | 11/1973 | Hechinger | 248/102 |
| 4,016,983 A | * | 4/1977 | Dadisman | 214/1 R |
| 4,079,559 A | * | 3/1978 | Tenbrummeler | 52/295 |
| 4,294,481 A | | 10/1981 | Pearl | |
| 4,566,661 A | * | 1/1986 | Mestler | 248/171 |
| 4,907,712 A | | 3/1990 | Stempin | |
| 5,035,269 A | | 7/1991 | Pytryga et al. | |
| 5,088,685 A | | 2/1992 | Salvucci, Sr. | |
| 5,100,007 A | | 3/1992 | Espasandin et al. | |
| 5,180,179 A | | 1/1993 | Salvucci | |
| 5,261,559 A | | 11/1993 | Salvucci, Sr. | |
| 5,558,246 A | * | 9/1996 | Ross, Jr. | 220/737 |
| 5,829,629 A | | 11/1998 | Usher | |
| 6,161,706 A | | 12/2000 | McCord | |

* cited by examiner

Primary Examiner—Kimberly Wood
(74) Attorney, Agent, or Firm—Rudolph J. Buchel, Jr.

(57) ABSTRACT

The present invention relates to a safety device for stabilizing cylindrically shaped objects and thereby reducing the occurrences of uncontrolled releases of their contents. With respect to an exemplary embodiment, a stabilization mechanism is presented which comprising a cylindrically shaped barrel, having a first opened end and a second opened end and which is fitted with a plurality of stabilization outriggers. Each of the plurality of outriggers extends from the exterior surface of the barrel, radially outward away from the barrel. The interior diameter of the barrel is sufficient to accept a pressurized cylinder or tank. The outriggers effectively increase the diameter of the base of the cylinder, and so doing, provides an added measurement of stabilization with respect to toppling over from an inadvertent action. In the other exemplary embodiments, as few as three outriggers provide stabilization for the cylinder. In accordance with another exemplary embodiment, a ring is fixed to the outriggers and in still another exemplary embodiment, the circular plate is attached to the lowermost extent of the barrel, the plate also having an opening sufficient for passage of the pressurized cylinder. Wheels may be attached to the outriggers in order that the tank may be moved by using the stabilization mechanism as a cart or dolly.

19 Claims, 18 Drawing Sheets

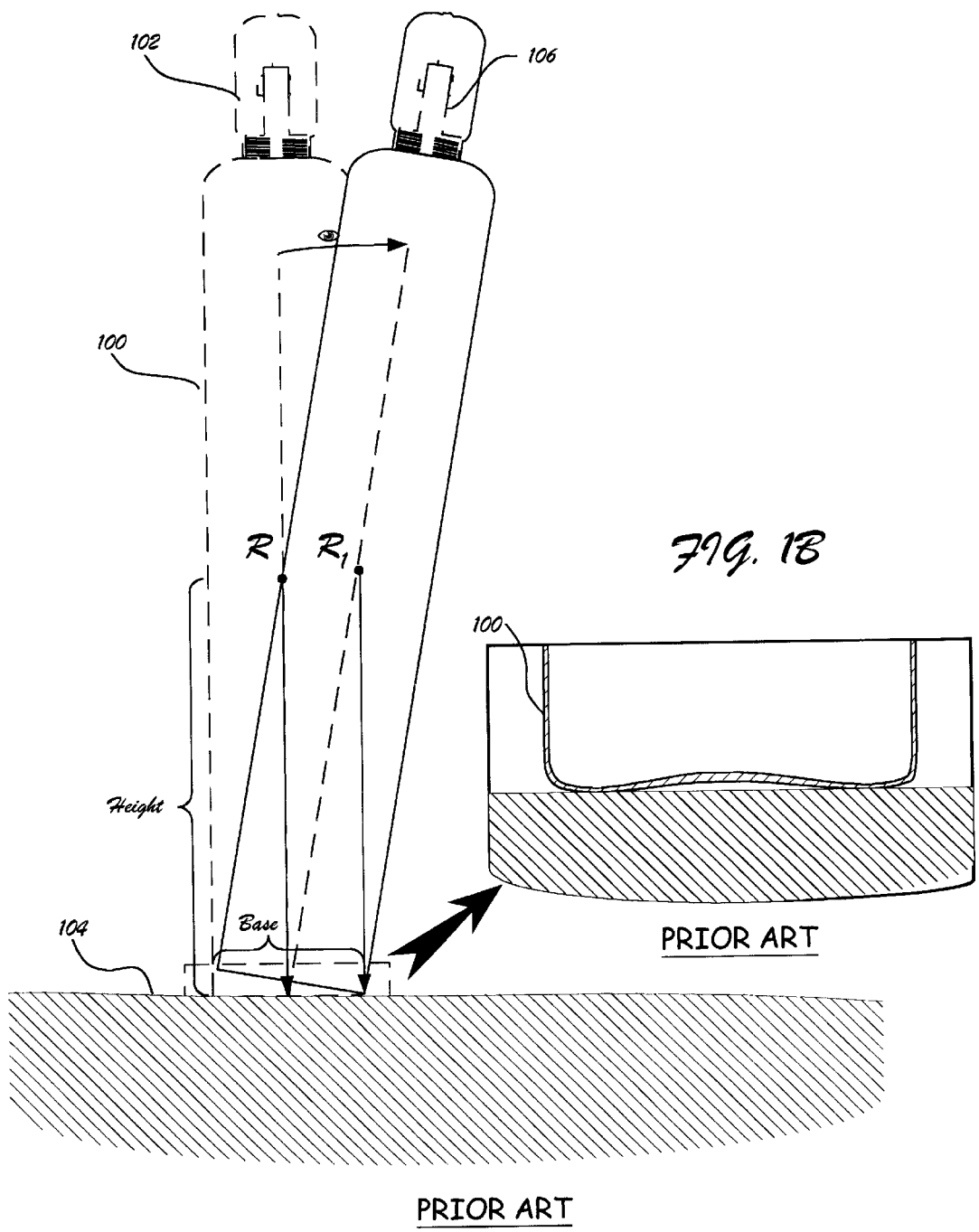

Tank Cart

PRIOR ART

SLIP-OVER TANK STABILIZER

Top View

Orthogonal View

Side View

Cut-Away View

FIG. 4A
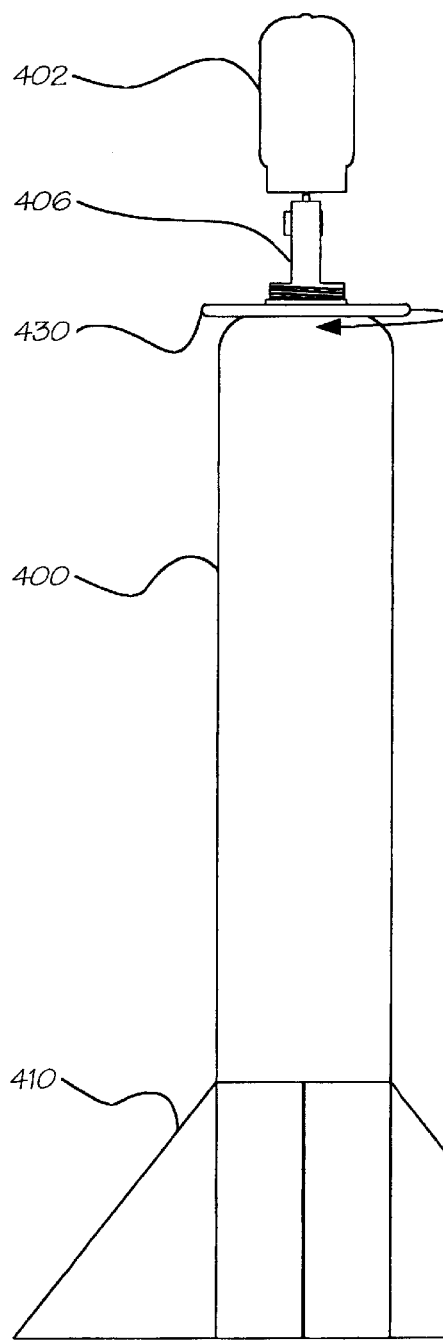
Spin-On Valve Protector
FIG. 4B
Cut-Away View
(Enlarged)
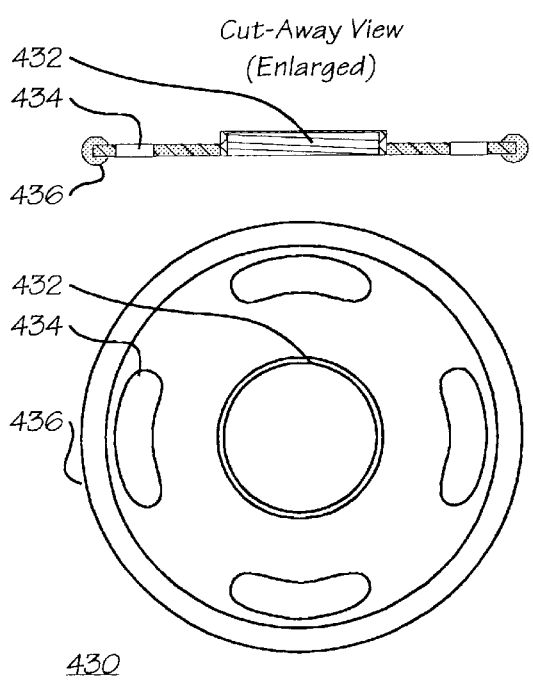
FIG. 4C
Top View (Enlarged)

SLIP-OVER TANK STABILIZERS
Outrigger Configurations

Three Fin

Top View

Side View

Eight Fin

Top View

Side View

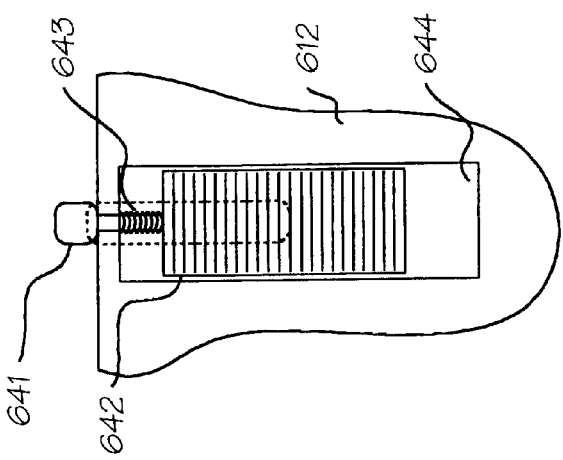
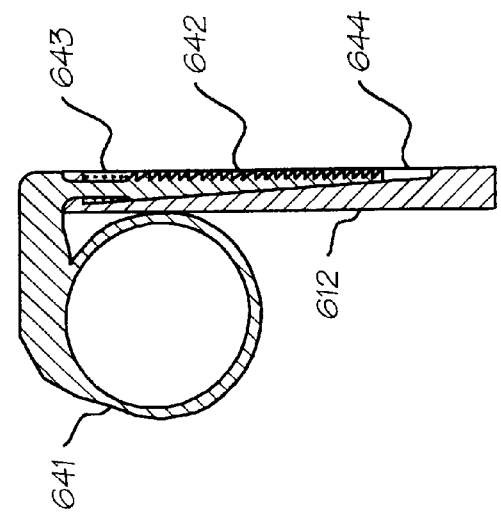
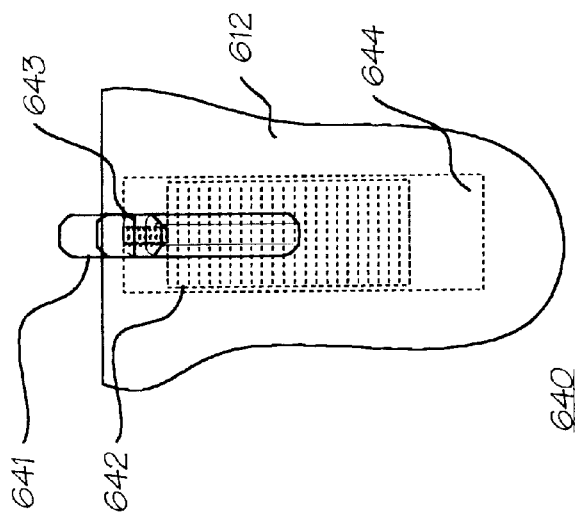
Wedge-Type Collet Anti-Slip Mechanisms
FIG. 6A Outside View
FIG. 6B Cut-Away View
FIG. 6C Inside View

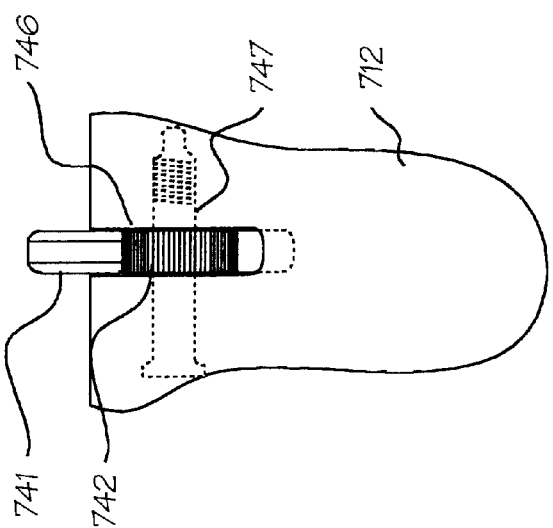
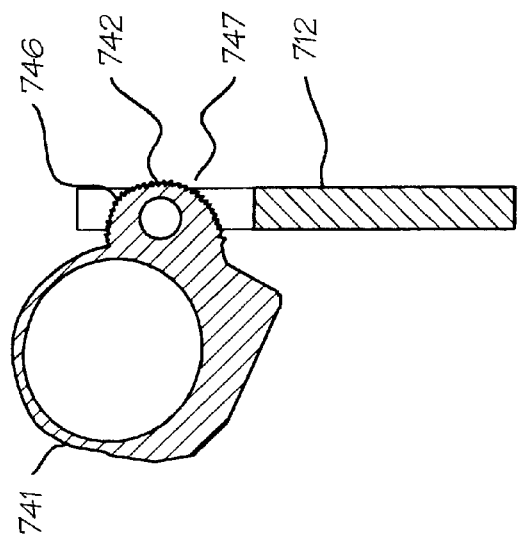
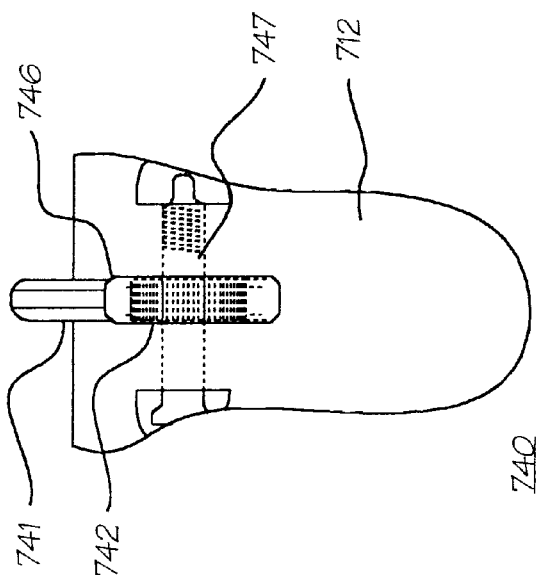
Cam-Type Lock
Anti-Slip Mechanism
FIG. 7A
Outside View
FIG. 7B
Cut-Away View
FIG. 7C
Inside View Locking Set Screws Side View Abrasive Insert Cut-Away View Snap Ring Or Hose Clamp Side View SLIP-OVER TANK STABILIZERS
Horizontal Stabilizer Configurations Top View Horizontal Plate Side View Top View Horizontal Ring Side View Flexible Finger, Self Locking, Stack-able, Stabilizer Side View Cut-Away View Self Locking, Wedge-Type Fin Stabilizer Side View Cut-Away View

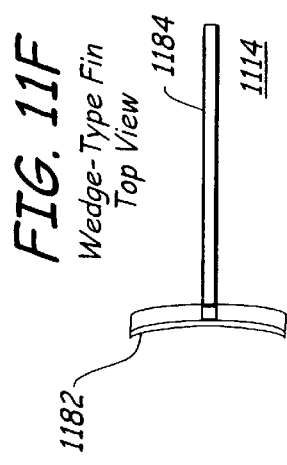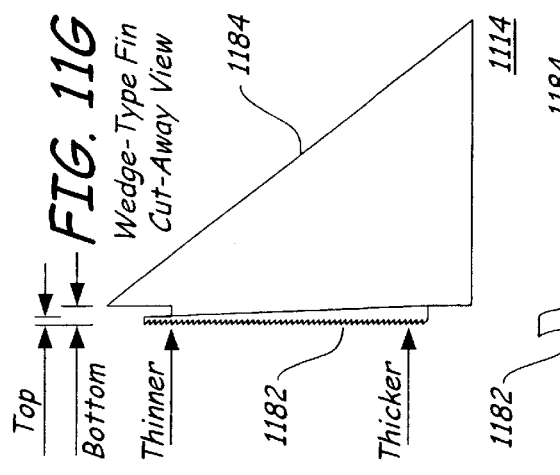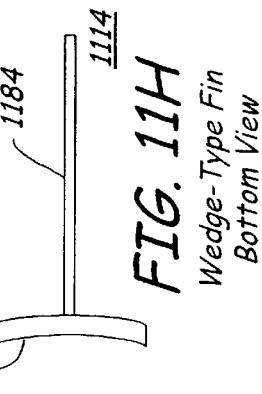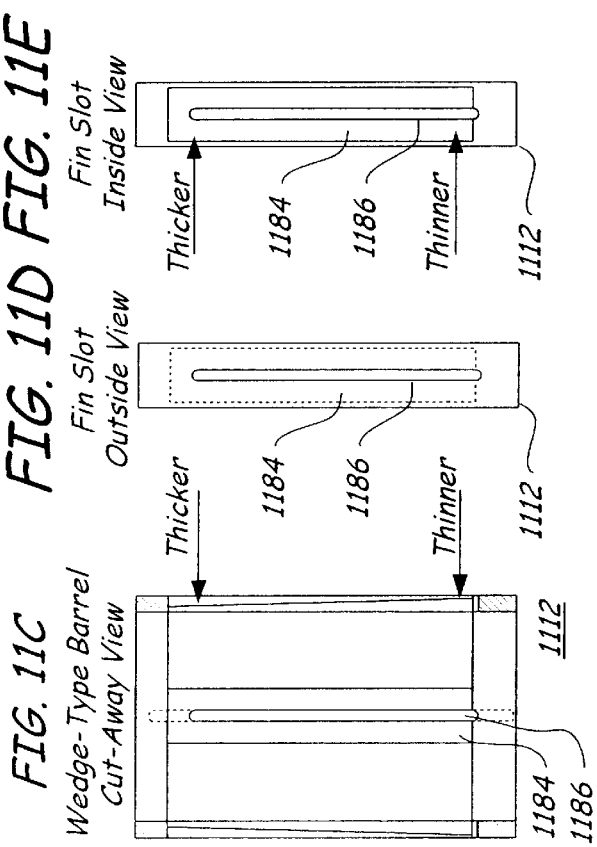

Self Locking, Two-Piece, Interlocking Collet Barrel Stabilizer

Front View

Cut-Away View

FIG. 13A
Top View
FIG. 13B
Side View
FIG. 13C
Single Fin Panel
Orthogonal View
FIG. 13D
Single Fin Panel
Top View
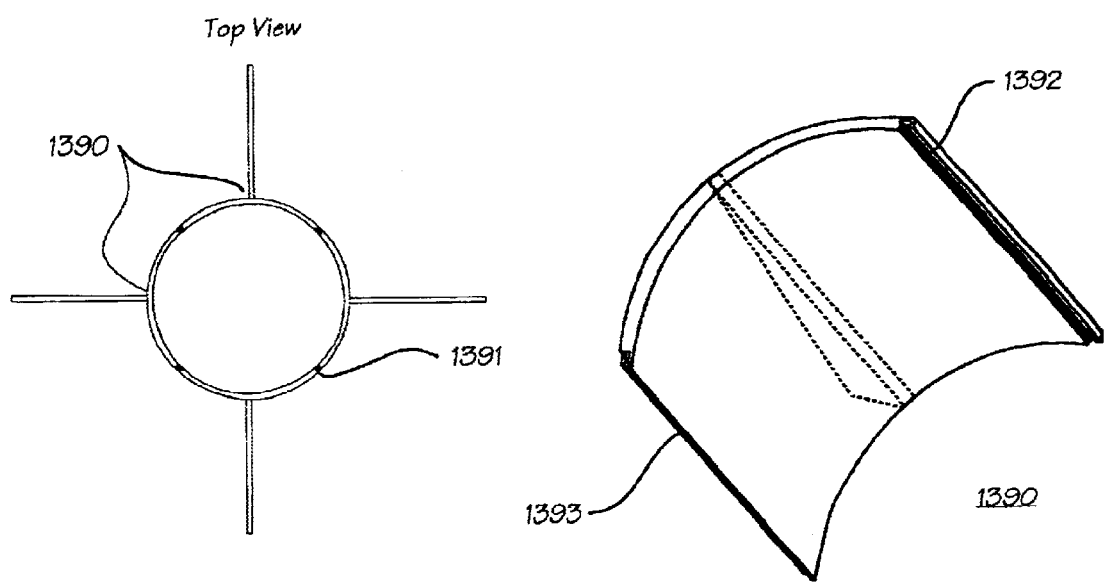
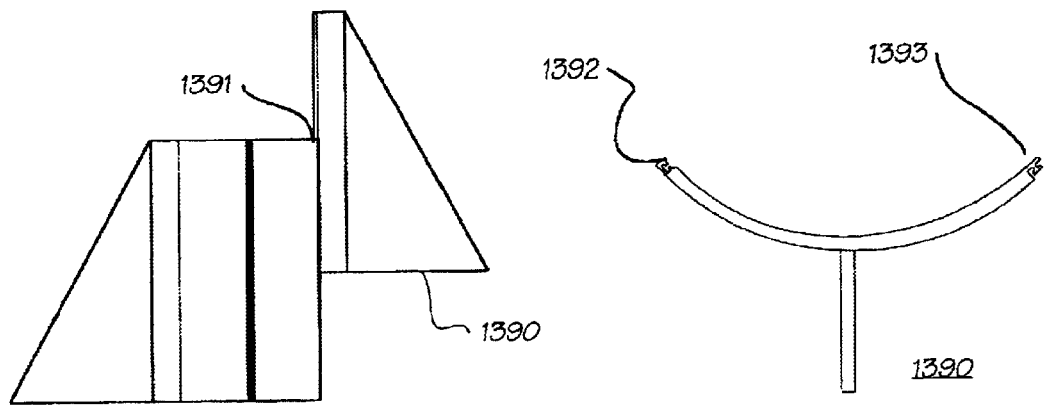

Outriggers Open

Outriggers Closed

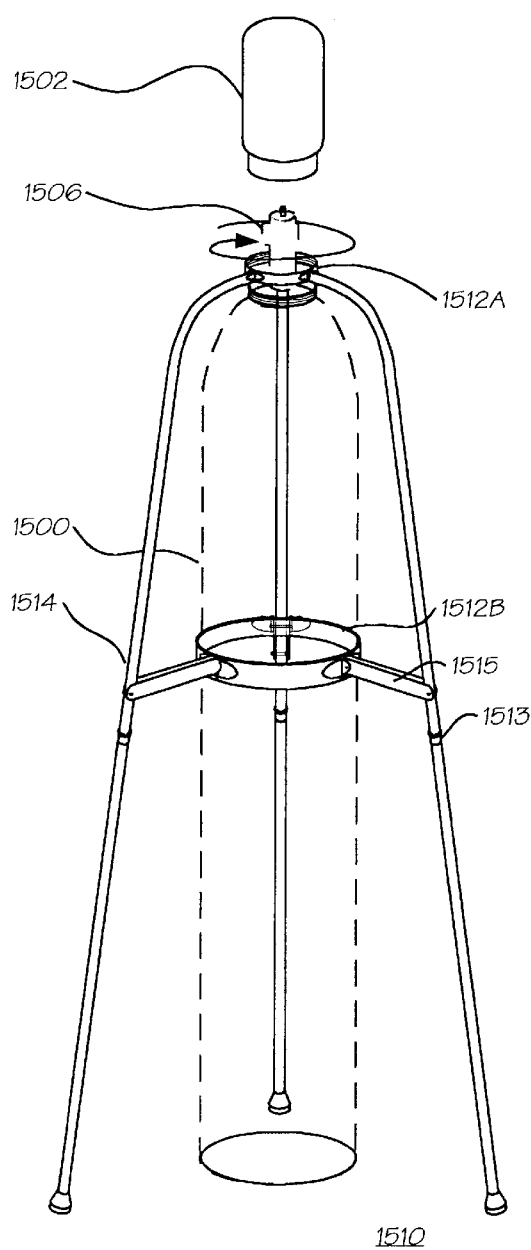
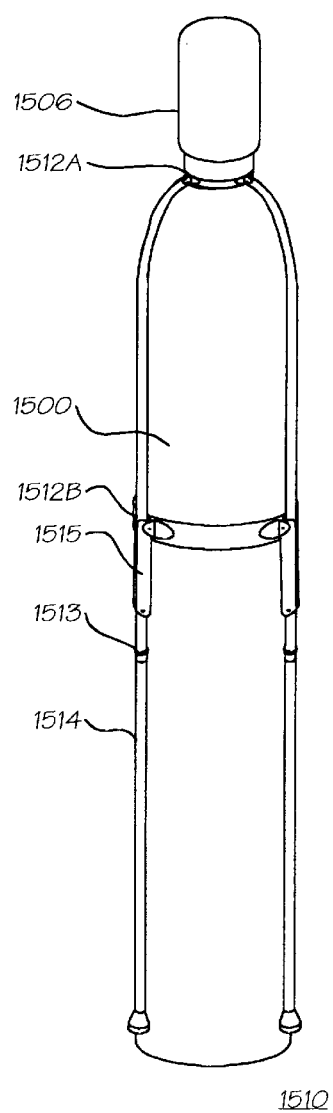
FIG. 15A
FIG. 15B

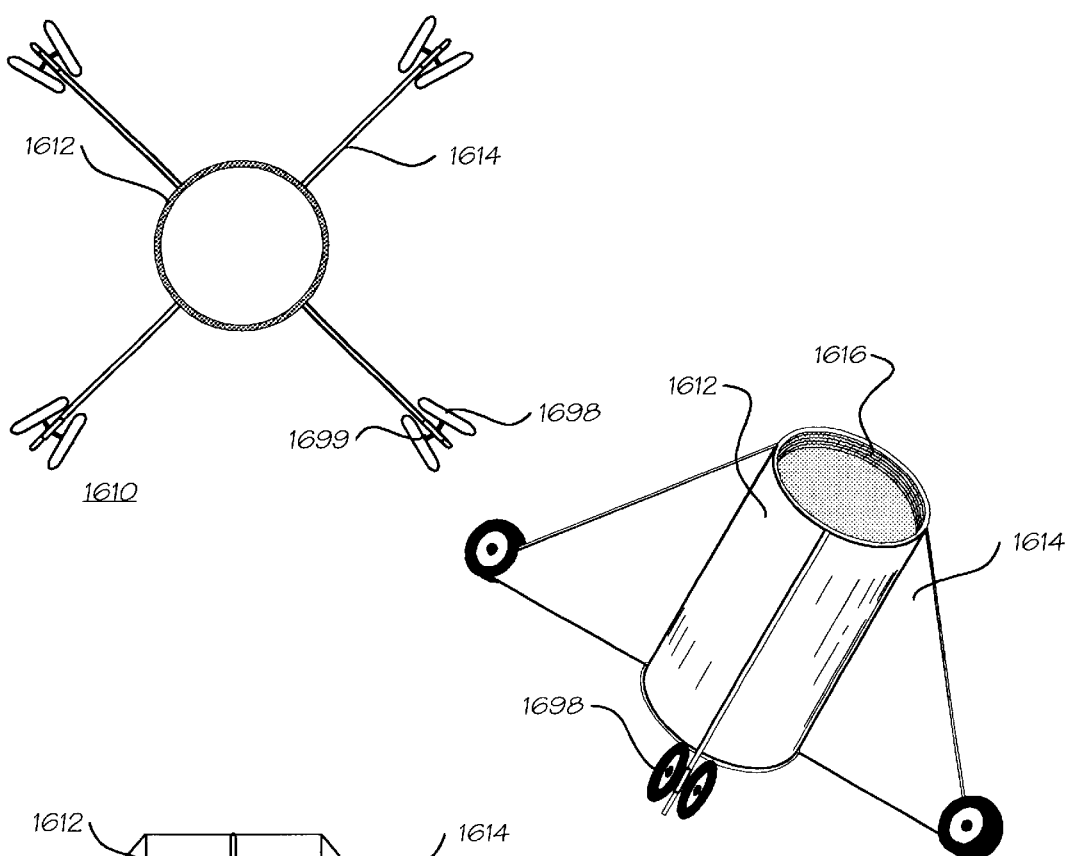
FIG. 16A
Top View
FIG. 16C
Orthogonal View
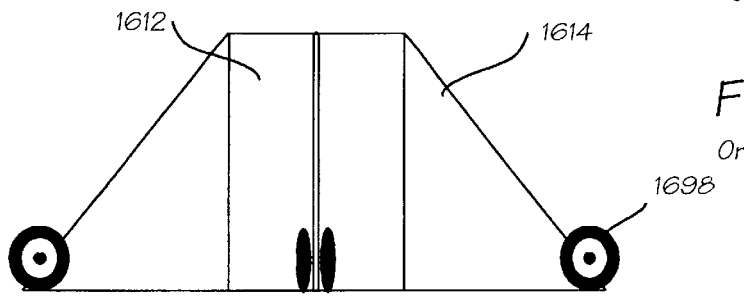
FIG. 16B
Side View

STABILIZATION MECHANISM FOR CYLINDERICALLY SHAPED OBJECTS

BACKGROUND OF THE INVENTION

1. Technical Field

The present invention relates to a safety device for stabilizing cylindrically shaped objects.

2. Description of Related Art

It is common practice in the industrial arts to pressurize various gaseous elements and compounds and then contain them in a cylindrically shaped pressure vessel or tank, normally called a cylinder. Typical contents of a cylinder include elements such as Argon (Ag), oxygen ($O_2$), nitrogen ($N_2$) chlorine ($Cl_2$), fluorine (F), hydrogen ($H_2$), helium (He), etc. and compounds such as acetylene (hydrocarbons having one or more carbon—carbon triple bonds), liquid petroleum gas (LPG, i.e., C3 or C4 such as propanes, butanes, etc.), carbon dioxide ($CO_2$), compressed air, etc. There are two types of hazards associated with the use, storage and handling of these compressed gas cylinders: the chemical hazard associated with the cylinder's contents and the physical hazards represented by the presence of a high-pressure vessel proximate to people or property. The chemical hazard potential associated with the contents of these cylinders include corrosive, toxic, flammable, etc., while the physical hazard relates to the extremely high pressures at which the contents are contained. Compressed gas cylinders have extremely high potential energies due to the latent energy of their highly compressed contents.

Typically, these cylinders have a combination value and port stem at the upper extent of the cylinder that penetrates the cylinder's wall to its inner cavity. Filling and unfilling the cylinder is accomplished through the valve and port stem. If the contents of a tank are released under controlled conditions, the corrosive, toxic, flammable and high energy attributes of the tank and its contents are of little consequence to a user. However, should an uncontrolled release occur, which may result from the tank toppling over and sheering its valve and port stem off, persons in the proximity of the release are in immediate danger. In fact, the potential energy contained in the fully 1.75 cu. ft. ($ft^3$) pressurized cylinder of nitrogen gas, $1.74 \times 10^6$ ft. lb. ($2.359 \times 10^6$J), is comparable to the latent energy equivalent to about 0.5 lb. (0.25 kg) of TNT, the potential energy of TNT being $3.42 \times 10^6$ ft-lb. ($4.63 \times 10^6$ J).

From the description above, it is apparent that any device for lessening the occurrence of uncontrolled releases from compressed gas cylinders would be beneficial.

SUMMARY OF THE INVENTION

The present invention relates to a safety device for stabilizing cylindrically shaped objects to reduce the possibility of cylindrically shaped tanks toppling over and possibly shearing off the tank's valve assembly. The safety device, therefore, reduces the occurrences of uncontrolled releases of the contents of a tank. With respect to an exemplary embodiment, a stabilization mechanism is presented which comprises a cylindrically shaped barrel, having a first opened end and a second open end and which is fitted with a plurality of stabilization outriggers. Each of the plurality of outriggers extends from the exterior surface of the barrel, radially outward away from the barrel. The inner diameter of the barrel is sufficient to accept a pressurized cylinder or tank. The outriggers effectively increase the diameter of the base of the cylinder, and in so doing, provide an added measurement of stabilization with respect to the cylinder toppling over from an inadvertent action. In the other exemplary embodiments, as few as three outriggers provide stabilization for the cylinder. In accordance with another exemplary embodiment, a horizontal ring is fixed to the outriggers and in still another exemplary embodiment, the horizontal plate is attached to the lower most extent of the barrel, the plate also having an opening sufficient for passage of the pressurized cylinder. Wheels may be attached to the outriggers in order that the tank may be moved by using the stabilization mechanism as a cart or dolly.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1A is a pictorial representation of a tank or cylinder which may have gases contained within under extreme pressures;

FIG. 1B is a pictorial representation of an enlarged cross sectional view of the base of the tank at rest on a floor surface;

FIGS. 4A–4C are pictorial diagrams depicting a slipover tank stabilizer used in combination with a spin-on valve protector in accordance with an exemplary embodiment of the present invention;

FIGS. 6A to 6C are pictorial diagrams that illustrate a wedge-type collet anti-slip mechanism in accordance with exemplary embodiment of the present invention;

FIGS. 7A to 7C are pictorial diagrams which illustrate a second type of anti-slip mechanism, a cam-type lock, in accordance with exemplary embodiment of the present invention;

FIGS. 11A–11F are pictorial representations of various aspects of a slipover tank stabilizer comprised of a plurality of self locking, wedge-type fin stabilizers in accordance with an exemplary embodiment of the present invention;

FIGS. 13A–13D are pictorial representations of views of a slipover stabilizer with interlocking fins in accordance with an exemplary embodiment of the present invention;

FIGS. 15A–15B are pictorial representations of views of a spin-on slipover stabilizer in accordance with an exemplary embodiment of the present invention; and FIGS. 16A–16C are pictorial representations of views of a slipover stabilizer with dolly wheels in accordance with an exemplary embodiment of the present invention.

DETAILED DESCRIPTION OF THE PREFERRED EMBODIMENT

Figure 1C:
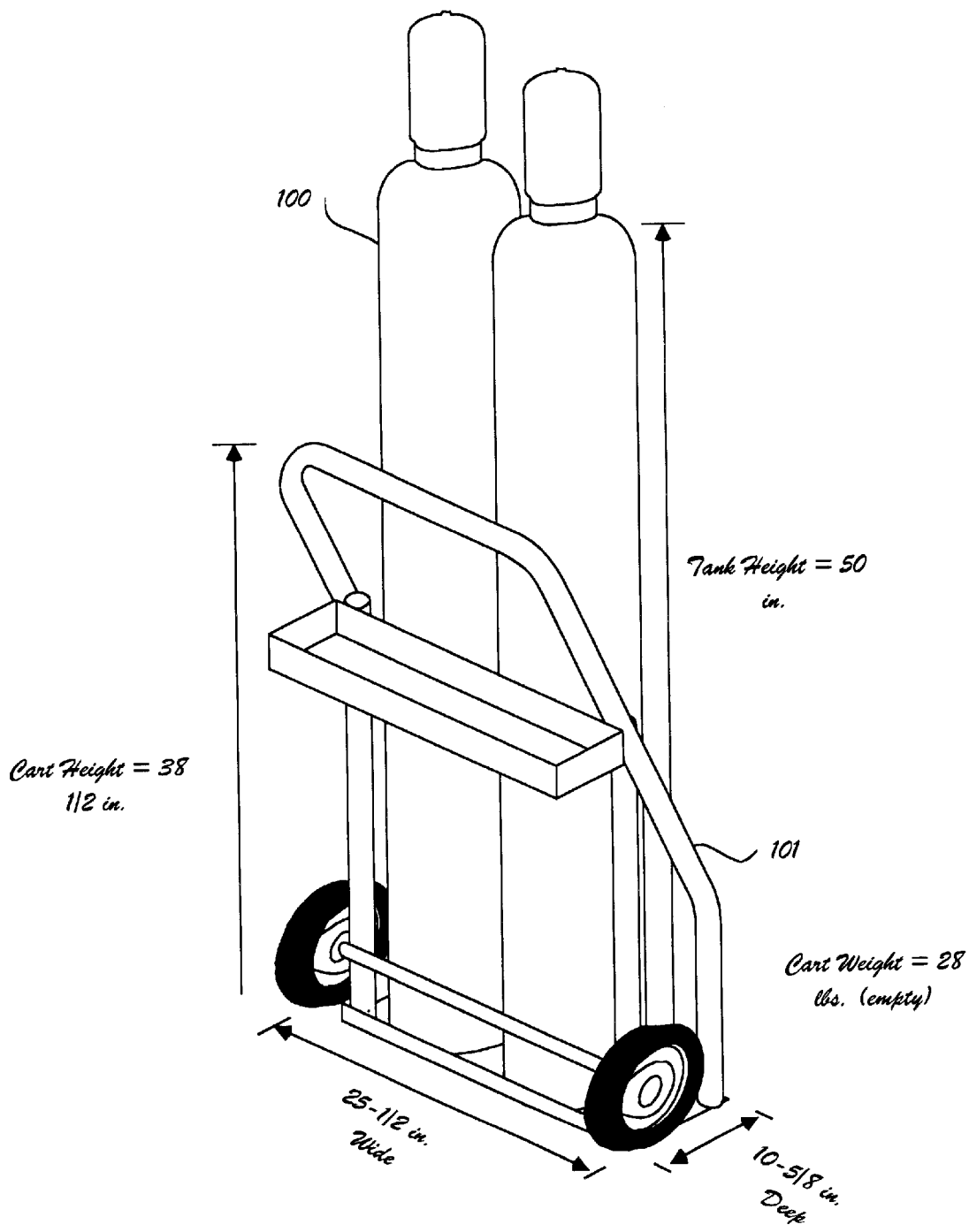
FIG. 1C is an illustration of a commercially available welding cart designed for transporting compressed gas cylinders such as acetylene, argon, helium and oxygen.

With reference now to the figures, FIG. 1A is a pictorial representation of a tank or cylinder which may have gases contained within that are confined under extreme pressures. Protective cap 102 is securely fastened onto the neck of tank 100 by means of the cap's inner threads coupling with exterior threads protruding from the neck of tank 100. Filling and unfilling tank 100 is accomplished through valve and port stem 106. Valve and port stem 106 traverses the upper wall of tank 100 and thereby provides a convenient entry point for accessing the contents of tank 100, however, the stem 106 is also the source of extraordinary danger because the stem can easily be sheared from tank 100 during an accidental toppling.

Tank 100 may be any cylindrically shaped pressure vessel such as 1.55 cu. ft. or 1.75 cu. ft. cylinders. These exemplary cylinders each have with a diameter of approximately nine inches and are between 50 and 54 inches high at the neck of the cylinder-protective cap 102 extends another six to eight inches from the neck. With respect to the description of the present invention, the dimensions of the 1.74 cu. ft. cylinder will be used throughout, but those of ordinary skill in that art would readily realize that the dimensions of the cylinder in no way limit the scope of the present invention. Additionally, the tare (empty) weight of a nine-inch diameter cylinder (1.55 cu. ft.—1.75 cu. ft.) is between 114 lbs. and 188 lbs. Therefore, apart for the danger associated with uncontrolled tank releases, an empty nine-inch diameter cylinder presents a credible hazard with regard to the tank being accidentally toppled over on an individual. The force generated by gravity on the weight of the empty tank in a toppling is substantial. A person in the path of a toppling cylinder may be severely injured without an uncontrolled release of the tank's contents.

In an upright position, tank 100 rests with the lower surface of its base in contact with floor surface 104. An adequate contact interface between tank 100 and floor 104 is essential for tank 100 to be stable in its upright position. For the purposes herewithin, stability refers to the property of an object that causes it, when disturbed from a condition of equilibrium or steady motion, to develop forces or moments that restore the original condition. Stability, with respect to stationary objects such as compressed gas cylinders, is inexorably linked to the center of gravity of the object. Tank 100, filled or unfilled, has a center of mass, R, also called the centroid or center of gravity. One of ordinary skill of the art would understand the center of gravity to be the point of a body at which the force of gravity can be considered to act and which undergoes no internal motion. For a discrete distribution of masses $m_i$, located at positions $r_i$, the position of the center of mass R is given as:

$$R \equiv \frac{\sum_i m_i r_1}{\sum_i m_i} \equiv \frac{\sum_i m_i r_1}{M} \tag{1}$$

$$\text{Where} \quad M = \sum_i m_i$$

For a compressed gas cylinder with gaseous contents, the center of mass R can be approximated at a point midway between the base of the cylinder and its neck, at the center of the cylinder's diameter, shown in FIG. 1A as R. In a cylinder with liquid contents the center of mass R will be somewhat lower due to the liquid settling to the bottom of the cylinder. For the discussion herewithin, the cylinder contents will be considered gaseous.

By finding the center of gravity of an object, the object's stability can be estimated based on the simple truths that the stability of a given object is inversely proportional to the vertical height of R and proportional to horizontal distance from R to the closest edge of its base. With respect to compressed gas cylinders, shortening a cylinder's overall height can increase stability, but this has the disadvantage of decreasing the cylinder's capacity and thus requiring more cylinders to be available to provide an equivalent amount of capacity. Similarly, the stability of a compressed gas cylinder may be increased by increasing its diameter, thus increasing the diameter of its base that contacts the floor surface. While it is true that compressed gas cylinders come in a variety of diameters, some more stable than others, it cannot be said that cylinder manufacturers are pushing forward any efforts for increasing the diameter of compressed gas cylinders as a safety initiative. The pragmatic truth with respect to the manufacture, transportation and use of compressed gas cylinders is that industries that depend on compressed gas for their livelihood have long since settled on the basic dimensions of gas cylinders. Any minimal stability increases realized by increasing the diameter of standard compressed gas cylinders would be far outweighed by the expense and inconvenience of implementing the new cylinders' design.

Turning back to FIG. 1A, tank 100 can be seen in two positions, first with the base parallel to floor surface 104, thus causing R to be centered within the circumference of the base. There, tank 100 is in its most stable position possible because R is approximately equidistant from any edge of the base. However, as tank 100 it tilted $\phi$ degrees such that R (shown as $R_1$) is positioned vertically over an edge of the base, the cylinder is at its most unstable. Defined herein, $\phi$ is the tip angle, or the angle at which an object is rotated such that it can no longer return to its equilibrium state. With respect to tank 100, once the position of $R_1$ traverses the circumference of the base, the cylinder can no longer return to its equilibrium state and the cylinder will topple over, the result of which may be catastrophic. In general, compressed gas cylinders are not considered to be stable objects because almost without exception their heights are greater than their bases by some factor.

Another problem that affects stability is that the base edges are often rounded, thereby reducing the tank's effective base diameter as depicted in FIG. 1B. FIG. 1B is a pictorial representation of an enlarged cross sectional view of the base of tank 100 while it is resting on floor surface 104. Note that the outer surface of the base does not completely make contact with floor surface 104. Squared, sharp edges at the base are important in order to maximize tank 100's contact diameter with floor surface 104. However, due to manufacturing and/or frequent rolling of compressed gas cylinders, the sharp edges at the base are often worn away or rounded thereby reducing the effective contact diameter of the base. The rounded edges on the base further reduce the stability of tank 100 by decreasing the effective diameter of its base.

Table I below illustrates the relationship between an object's height and base diameter to its tip angle, $\phi$, for homogeneous, cylindrically shaped objects such as compressed gas cylinders. For ease of computation the height is taken from the neck of the cylinder, thus disregarding any increased instability due to the protective cap and valve.

TABLE I

| Height | Base | Tip Angle (Degrees) |
|---|---|---|
| 1.00 | 1.00 | 45.00 |
| 2.00 | 1.00 | 26.56 |
| 3.00 | 1.00 | 18.43 |
| 4.00 | 1.00 | 14.03 |
| 5.00 | 1.00 | 11.30 |
| 6.00 | 1.00 | 9.462 |
| 50.00 | 9.00 | 10.20 |
| 50.00 | 8.50 | 9.65 |
| 50.00 | 8.00 | 9.09 |
| 50.00 | 14.00 | 15.64 |
| 5000 | 18.20 | 20.00 |
| 50.00 | 19.00 | 20.80 |
| 50.00 | 29.00 | 30.11 |

(For homogeneous, cylindrically shaped objects)

From Table I it is apparent that as the height increases relative to the base diameter, the tip angle decreases, making the cylinder less stable. The first six entries are for cylinders having a base of one unit while the heights vary from one unit to six units. Notice that a cylinder having a height to base ratio of one to one has a tip angle of 45 degrees, a very stable cylinder. As the height of a cylinder doubles to two units from one unit with respect to a base of one unit, the cylinder's tip angle decreases correspondingly to 26.56 degrees, less stable than one to one height to base ratio, but still a very stable cylinder. As the ratios of height to base progresses through the next four entries in Table I to a six to one height to base ratio, the tip angle is further reduced a corresponding amount to 9.46 degrees. Clearly, a cylinder with a six to one height to base ratio is not very stable and considering the amount of potential energy stored in a compressed gas cylinder, such a cylinder could present a potential hazard.

The dimensions of a typical 1.75 cu. ft. cylinder are approximately fifty inches in height and nine inches in diameter. As can be seen in Table I, a cylinder with fifty to nine height to base ratio has a tip angle of approximately 10.20 degrees. From Table I it can be inferred that should an operator accidentally tip a 1.75 cu. ft. cylinder filled with compressed gas more than 10.20 degrees, the tank will topple over as it has passed its maximum tip angle and has no possibility of returning to its equilibrium. Such an accident may have catastrophic effects due to potential energy stored in a filled tank.

The succeeding two entries in Table I show the differences in tip angles for a cylinder with rounded edges at it base. Rounded edges reduce the effective base of the tank that makes contact with the floor surface. Reducing the effective base diameter of a 1.75 cu. ft. cylinder to 8.50 inches decreases the cylinder's tip angle to 9.65 and further reducing the effective base diameter to eight inches decreases the tip angle to 9.09 degrees. From Table I it can be seen that even a minimal amount of base rounding has an effect on a cylinder's stability.

On the other hand, notice that if the effective diameter of a 1.75 cu. ft. cylinder could be increased by ten inches, the tip angle would realize a corresponding increase to 20.80 degrees, as shown in the second from last row. Even further, if that cylinder's radius could be further increased by an additional five inches, the cylinder's tip angle would increase to 30.11 degrees as can be seen the last row of Table I. A cylinder with a tip angle of 30.11 degrees is a very stable tank.

Rules regarding tank stability seem to be rather relative concepts in most industries. For instance, most industries have safety rules that require that compressed gas cylinders be capped with a protective safety cap and stored in a secure manner. A secure manner usually entails a mechanism for confining a cylinder to a semi-permanent structure such as a wall, support pole or workbench. The confinement mechanism may be a chain or cable that is attached to the structure and secures the cylinder at a point at least one half the height of the cylinder. Most facilities have designated tank storage areas that comply with these storage rules. Rules for handling and transportation of compressed gas cylinders may be found, for instance, in 29 CFR Part 1919, OSHA Standards from the Occupational Safety and Health Administration, available from U.S. Department of Labor, Occupational Safety and Health Administration (OSHA) 200 Constitution Avenue, N.W. Washington, D.C. 20210 and the Compressed Gas Association, Inc., 1725 Jefferson Davis Hwy., Suite 1004, Arlington, Va. 22202-4102 and rules for construction and maintenance of portable cylinders used for storage and shipment of compressed gases may be found, for instance, in 49 CFR Parts 171–179 DOT Standards from the U.S. Department of Transportation. Publications are available from the U.S. Department of Transportation at U.S. DOT/RSPA/HMS/OHMIT/DHM-50, 400 7th Street, S.W., Washington, D.C. 20590-0001.

Operational or staging areas of a facility are usually not equipped with the perquisite safety mechanisms for securing compressed gas cylinders. For example, loading docks are rarely equipped to safely confine compressed gas cylinders, so whenever a shipment of cylinders arrive, the tanks are often temporarily positioned against a wall, or merely left standing in place until the cylinders can be carted to the storage area. It is tempting to lay compressed gas cylinders horizontally on the floor surface until they can be transported to the storage area. While laying tanks on their sides does reduce the chance of a tank being upset, this practice may increase other risks associated with the tanks. For example, an acetylene cylinder is filled with a "monolithic filler" in which acetone is added to absorb and stabilize the acetylene. However, if the acetone/acetylene solution is not held within the fiber, it is easy to produce acetone from the cylinder and leave volatile, unsuspended acetylene in the tank.

Even when compressed gas tanks are being used, they are sometimes arranged in a manner which is no more stable than a standing compressed gas cylinder. FIG. 1C is an illustration of a commercially available welding cart designed for transporting compressed gas cylinders such as acetylene, argon, helium and oxygen. Notice that although the base of the cart is 25 ½ inches wide at the wheeled side, it is only 10 ⅝ inches deep at the handle side, thus only marginally increasing stability in the direction of the handle. It should be understood that while the center of gravity of the tank/cart combination is somewhat lower than a cylinder alone, thereby further increasing stability over a cylinder alone, the horizontal position of the center of gravity is now toward the handle. The new horizontal position of the center of gravity tends to negate some of the advantageous effects of the lower center of gravity. The advantageous effects are further negated when two compressed gas cylinders are present in the cart which causes the center of gravity to be higher than when a single tank is present in the cart. While compressed gas cylinders are only marginally more stable in a welding cart, such as that shown in FIG. 1C, the consequences resulting from a cylinder falling may be much more severe. Accidents tend to be more catastrophic whenever compressed gas cylinders are toppled from a cart because the cylinder's protective cap is often removed and a regulator is attached to the valve and port assembly. It is therefore much more likely that the valve and port assembly will be sheared off and an uncontrolled, catastrophic release occurs.

What is needed in the art is a realistic understanding that present safety measures, with regard to compressed gas cylinders, are incongruous which results in a false sense of security. While the incidents of catastrophic releases may have been reduced with respect to storage and transportation of compressed gas cylinders, releases at staging and waypoint areas remain a problem. The inventor of the present invention understands that the cause of these incidents to be a combination of unskilled personnel, complex and time consuming safety procedures combined with inconvenient, complex and sometimes antiquated safety equipment.

Firstly, it should be recognized that some personnel who handle compressed gas cylinders are not as experienced, as well trained or as cognizant of the catastrophic potential of gas cylinders as personnel who handle gas cylinders on a regular basis. This is evident in the staging areas such as loading docks and procurement areas. There, personnel handle gas cylinders infrequently and tend to forget or circumvent safety requirements. Many times these workers seem oblivious to the consequences that may result from their actions or omissions. Next, it should also be recognized that workers, no matter how experienced, well trained or cognizant, will take shortcuts around safety procedures that they perceive to be cumbersome and inconvenient. Workers tend to rationalize these safety shortcuts by the savings of time and effort. Finally, it should also be recognized that management might have many of the same limitations of the worker in understanding safety equipment and procedures but additionally resist implementing expensive safety solutions. Many times complicated safety equipment is also expensive to buy, install and maintain so management is less than eager to implement it.

Therefore, in an effort to alleviate the shortcomings in the prior art, the present invention provides for a convenient, inexpensive means to reliably stabilize compressed gas cylinders from inadvertently toppling over. FIGS. 2A–2D are pictorial representations of a slipover tank stabilizer for use with, for example, cylindrical containers filled with compressed gases in accordance with an exemplary embodiment of the present invention. With respect to FIGS. 2A–2D, slipover tank stabilizer 210 comprises cylindrically shaped barrel 212, having a first opened end and a second opened end, which is fitted with a plurality of stabilization outriggers, outriggers 214. Outriggers 214 extend from the exterior surface of barrel 212 and extend radially outward away from barrel 212. Slipover tank stabilizer 210 may be formed from any one of a number of strong, rigid materials, such as metals, plastics, acrylics, composite material, etc. Outriggers 214 must be rigidly affixed to barrel 212 and themselves have strength enough to support the compressed gas cylinder without distorting. In FIGS. 2A–2D, outriggers 214 are depicted as being "fin" or delta shaped, but in practice may be of any shape which is capable of contacting the floor surface at its outermost extent while maintaining the prerequisite cantilevered loading forces exerted by the tank.

Figure 2A:
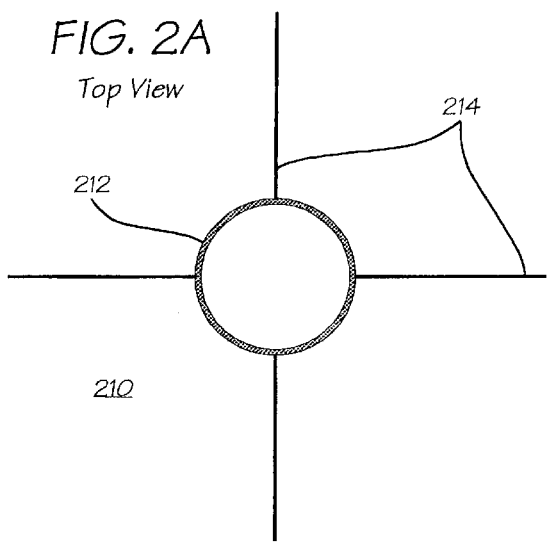
FIGS. 2A–2D are pictorial representations of a slip-over tank stabilizer for use with, for example, cylindrical containers filled with compressed gases in accordance with an exemplary embodiment of the present invention.
Figure 2C:
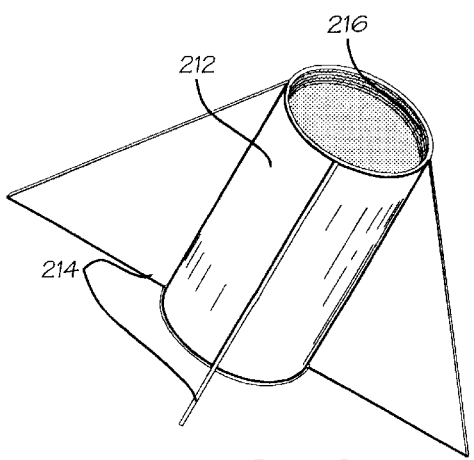
Figure 2B:
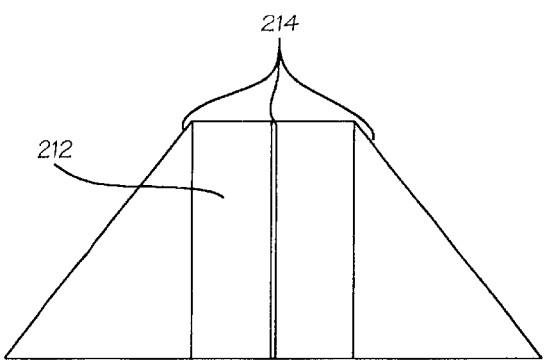
Figure 2D:
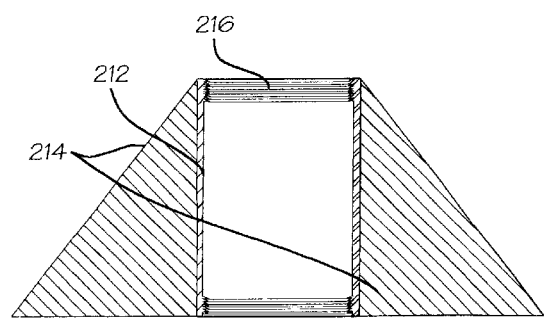

Configured thusly and positioned on the base of a cylinder, outriggers 214 greatly increase the effective base of the cylinder and therefore a corresponding increase in the tip angle is also realized. The tank's stability is thereby increased with slipover tank stabilizer 210 in place. Notice that the interior openings of barrel 212 are sufficient to accept a cylindrically shaped tank of a given diameter without requiring an extraordinary effort from a worker. Once in place at the base of a cylinder, slipover tank stabilizer 210 resists "riding up" on the cylinder partially due to close tolerance of the barrel's internal diameter to the outer diameter of a given cylinder. For added assurance against slipover tank stabilizer 210 riding up on the cylinder, slipover tank stabilizer 210 is fitted with an anti-slip mechanism, shown in FIGS. 2C and 2D as internal ridges 216. Internal ridges 216 exert horizontally directed force directly on the surface of a cylinder when a vertical force is applied to one or more of outriggers 214. The horizontal force causes the inner surface of barrel 212 to bind with the exterior surface of the cylinder. Internal ridges 216 further bind with the exterior surface of the cylinder by gripping any paint or surface imperfections on the cylinder. Internal ridges 216 may be positioned along the entire length of the interior surface of barrel 212 or may instead only occupy a portion of the internal surface. Note that FIGS. 2C and 2D depict internal ridges 216 on the extreme upper and lower portions of the interior surface of barrel 212. Internal ridges 216 are considered to be a passive anti-slip mechanism because the mechanism requires little or no intervention by the user to be effective.

Figure 3:
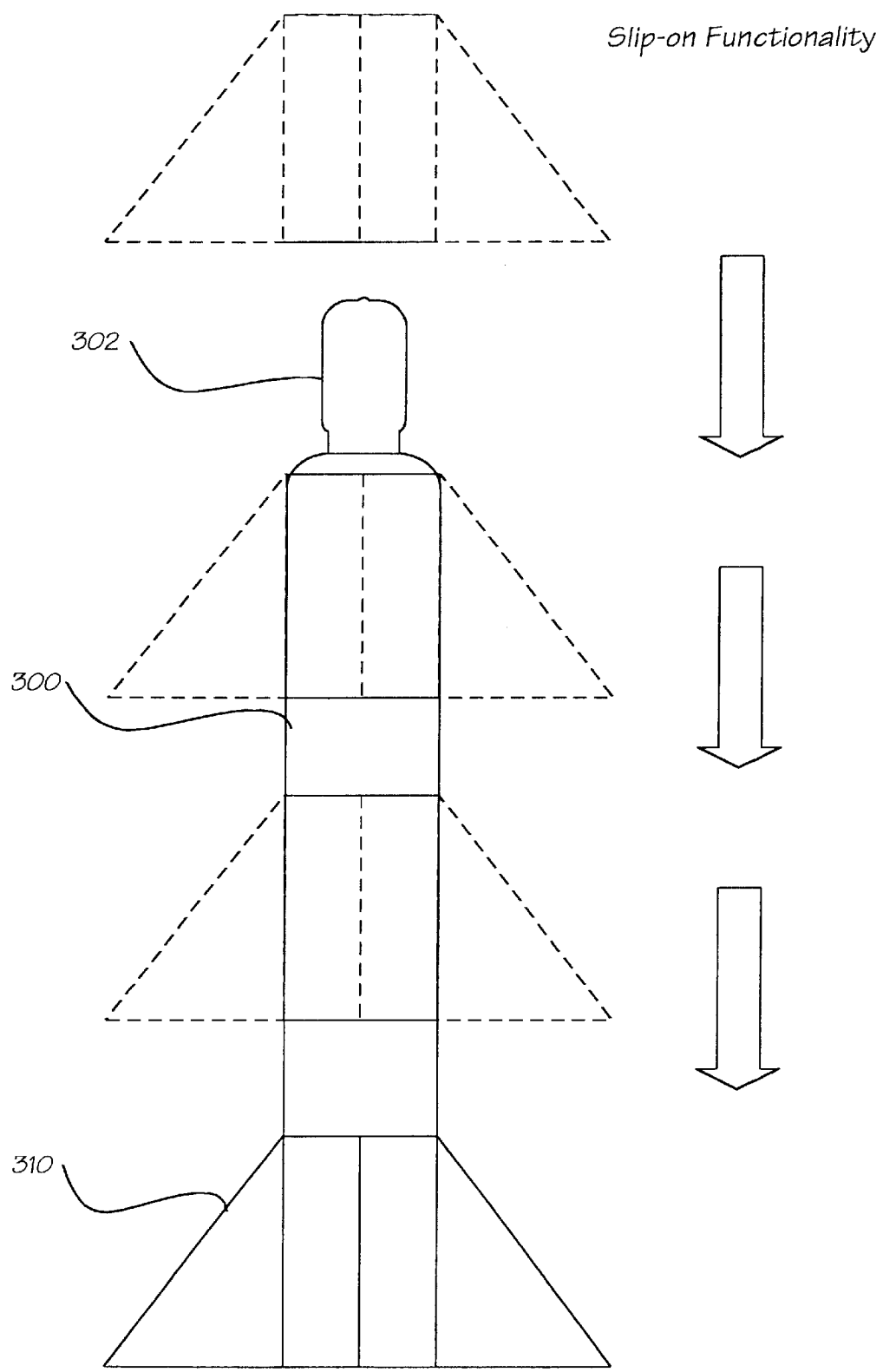
FIG. 3 illustrates the slip-on functionality of the stabilization mechanism in accordance with an exemplary embodiment of the present invention.

FIG. 3 illustrates the slip-on functionality of the stabilization mechanism in accordance with an exemplary embodiment of the present invention. The stabilization mechanism of the present invention is both useful, in that it increases the stability of cylinders and convenient because it is easily deployed by personnel with little or no special training. Operation of the slipover tank stabilizer is largely intuitive and requires very little time or preparation for successful deployment. As depicted in FIG. 3, a user merely positions the center opening of the barrel of slipover tank stabilizer 310 over protective cap 302 and then around tank 300. Slipover tank stabilizer 310 is oriented with the maximum radial extent of the outriggers positioned downward. Once slipover tank stabilizer 310 is situated around tank 300, the user simply pushes slipover tank stabilizer 310 downward toward the base of tank 300. After slipover tank stabilizer 310 makes contact with the floor surface, slipover tank stabilizer 310 is in its optimum position. Following positioning a slipover tank stabilizer with a passive anti-slip mechanism, no further action is required by the user because as the stabilizer will remain in its most downward position and resist riding upward on tank 300 until removed by the user. Removal of slipover tank stabilizer 310 is likewise intuitive, the user merely pulls slipover tank stabilizer 310 up and over tank 300. Due to resistance from the anti-slip mechanism, removal might require the user to wiggle slipover tank stabilizer 310 from side to side as it is moved upward on tank 300.

FIGS. 4A–4C are pictorial diagrams depicting a slipover tank stabilizer used in combination with a spin-on valve protector in accordance with an exemplary embodiment of the present invention. FIG. 4A shows tank 400 in which slipover tank stabilizer 410 has been properly deployed, thereby stabilizing tank 400 without the need for extravagant and complicated stabilization equipment. Those skilled in the art will realize that normally a compressed gas cylinder is transported with protective cap 402 securely threaded to the neck of tank 400, but while in service protective cap 402 is normally removed to allow for coupling valve and port assembly 406 with a manifold. With protective cap 402 removed, tank 400 is most vulnerable to an uncontrolled release of its contents by valve and port assembly 406 and/or the manifold striking an object during a fall and shearing valve and port assembly 406 from tank 400. Spin-on protector 430 is designed to protect valve and port assembly 406 during a fall by providing a buffer interval between valve and port assembly 406 and any object that might contact it, such as the floor surface. FIGS. 4B and 4C illustrate spin-on protector 430 in detail. Spin-on protector 430 is designed with interior threads 432 that cooperate with the exterior threads on tank 400 in a similar fashion as the interior threads on protective cap 402. The body of spin-on protector 430 is composed of sufficiently resilient material to absorb the impact from a fall. Spin-on protector 430 may also be lined with shock absorbing edge material 436, such as foam, rubber, neoprene, etc., in order to further absorb impact forces and provide cushioning during a fall. The height of internal threads 432 is kept to a minimum in order for spin-on protector 430 to be used simultaneously with protective cap 402. Alternatively, spin-on protector 430 may be fitted with inner threads 432 for cooperating with the outer threads on tank 400 and also fitted with outer threads for cooperating with the inner threads on protective cap 402. In this configuration (not shown), the neck portion spin-on protector 430 must be of sufficient length to accommodate inner threads 432 on the lower portion, then step down in diameter for accommodating the outer threads on the upper portion of the neck portion. In either embodiment, valve and port assembly 406 is always protected by spin-on protector 430 in the event of tank 400 being toppled. In a further refinement, spin-on protector 430 is fitted with several handholds 434 for gripping. Handholds 434 provide users with a convenient gripping surface during transportation and service. While FIGS. 4A–4C depict spin-on protector 430 as having a substantially planar body, the body may instead be concave shaped with the exterior extent of spin-on protector 430 extending above valve and port assembly 406 while leaving enough space for insertion of protective cap 402.

In accordance with another exemplary embodiment, the valve protector may accommodate tanks without external threads. For those types of tanks the valve protector is fastened to an upper portion of tank 400 using set screws or a snap ring or a hose clamp. The set screws, snap ring or hose clamp provides a gripping mechanism for the outer surface of tank 400 as will be described below with respect to slip over tank stabilized shown on FIGS. 8B and 8C.

Figure 5A:
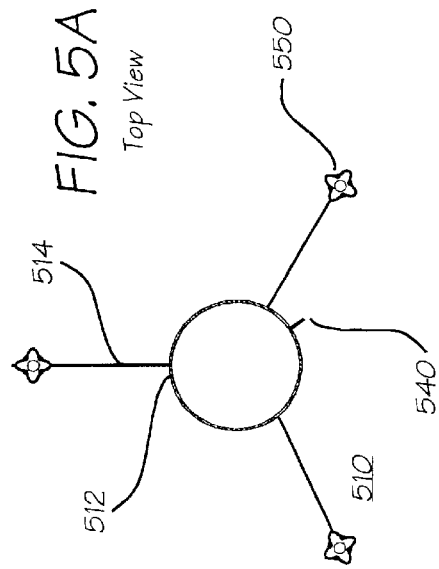
FIGS. 5A–5D are pictorial representations illustrating two outrigger arrangements for slipover tank stabilizers in accordance with an exemplary embodiment of the present invention.
Figure 5B:
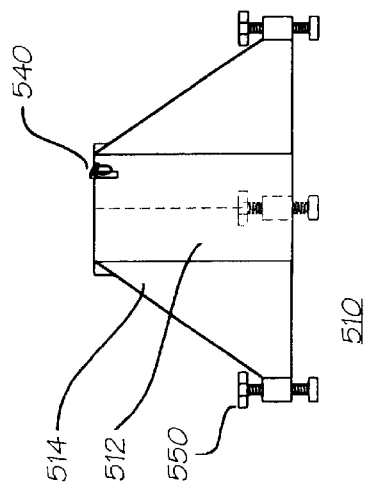
Figure 5C:
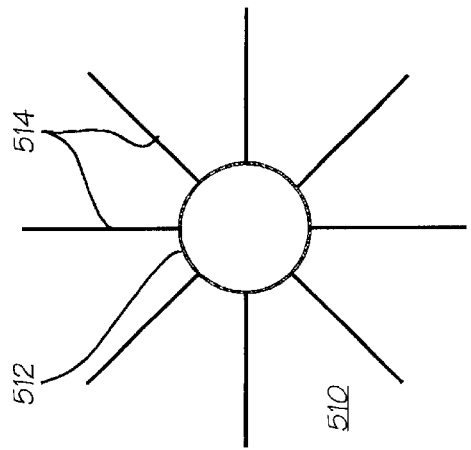
Figure 5D:
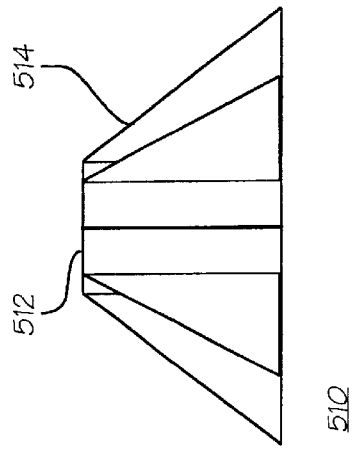

Slipover tank stabilizers may be configured in a number of outrigger arrangements. FIGS. 5A–5D are pictorial representations illustrating two outrigger arrangements for slipover tank stabilizers in accordance with an exemplary embodiment of the present invention. FIGS. 5A and 5B illustrate slipover tank stabilizer 510 as having three evenly spaced outriggers 514 which each extends radially from barrel 512. In order for slipover tank stabilizer 510 to provide minimal stabilization benefits around the circumference of a cylinder, slipover tank stabilizer 510 must comprise at least three outriggers 514 to be effective. FIGS. 5C and 5D show slipover tank stabilizer 510 configured with eight evenly spaced outriggers 514 as opposed to three shown in FIGS. 5A and 5B. While slipover tank stabilizer 510 may have as few as three outriggers to offer some minimal stabilization benefits, the effective base diameter of slipover tank stabilizer 510 is proportional to the number of evenly spaced outriggers, therefore, more than three outriggers is usually desirable.

TABLE II

| Number of Equally Spaced Outriggers | Relative Increase of Outrigger Length to Effective Base |
| --- | --- |
| 3 | 1.00 |
| 4 | 1.41 |
| 5 | 1.62 |
| 8 | 1.84 |
| 10 | 1.90 |

Table II above demostrates the relationship between the relative increase of outrigger length to the effective base of a slipover tank stabilizer and the number of outriggers configured on a stabilizer. For example, by increasing the radial length of the three outriggers on slipover tank stabilizer 510 by five inches, the effect base would only increase by five inches. The diameter of a cylinder's effect base is a trigonometric function based on the angle between adjacent outriggers and not merely a product of opposing outrigger lengths. Therefore, the effective base for a 1.75 cu. ft. cylinder would increase to thirteen inches by using slipover tank stabilizer 510 having three-five inch outriggers. By returning to Table I, it can be seen that the tip angle for a 1.75 cu. ft. cylinder and slipover tank stabilizer configured with three-five inch outriggers is 14.75 degrees. If, however, the diameter of a cylinder's effect base could be calculated as a product of opposing outrigger lengths, then the effective base would equal 18 inches and the cylinder's tip angle would increase to 19.80 degrees. This can only be accomplished by configuring the slipover stabilizer with an infinite number of equally spaced outriggers, thereby bringing the angle between adjacent outriggers to zero degrees.

From Table I it can be realized that as the outrigger spacing get tighter, the tip angle is reduced for a similarly sized outrigger. In another example, taking a slipover tank stabilizer configured as shown in FIGS. 5C and 5D with eight outriggers, if the radial length of an outrigger is five inches, the effect base would increase by 17.2 inches because the angle between adjacent outriggers has decreased. From Table I above it can be seen that the tip angle for a slipover tank stabilizer configured with eight-five inch outriggers increases to 18.98 degrees.

In addition to the variance of outrigger configurations, FIGS. 5A–5B also illustrate other options available to a user for optimizing cylinder stability. For example, FIGS. 5A and 5B show leveling adjusters 550 at the outward extent of each outrigger 514. Leveling adjusters 550 are used in cases where the floor surface is uneven, which has the effect of decreasing the effective tip angle. By adjusting one of leveling adjusters 550, a user can compensate, somewhat, for an uneven floor surface. Also shown in FIGS. 5A and 5B is anti-slip mechanism 540, which engages the cylinder and prevents slipover tank stabilizer 510 from riding up on the cylinder body and destabilizing the tank.

One benefit of the present invention is the convenience of increasing stability afforded to users by sliding the slipover tank stabilizer over the cylinder into place without unnecessary exertion or effort. By design, the slipover tank stabilizer slides into place with ease. However, in order for the slipover tank stabilizer to provide maximum stabilization benefit, the slipover tank stabilizer cannot ride up on the cylinder when pressure is exerted on the outriggers. The anti-slip mechanism prevents the slipover tank stabilizer from riding up on the cylinder unless controlled by the user, in accordance with an exemplary embodiment of the present invention. Two basic types of anti-slip mechanisms are disclosed here within: passive and active. A passive anti-slip mechanism works to prevent slippage between the slipover tank stabilizer and the cylinder without intervention from the user. In contrast, an active anti-slip mechanism requires some intervention by the user. FIGS. 6 to 8 are diagrams which illustrate exemplary anti-slip mechanisms in accordance with an exemplary embodiment of the present invention.

FIGS. 6A to 6C are pictorial diagrams which illustrate a wedge-type collet anti-slip mechanism in accordance with exemplary embodiment of the present invention. Wedge-type collet 640 is an example of a passive type of anti-slip mechanism which binds teeth on ramped or wedged collet 642 to the outer wall of the cylinder. Ramped collet 642 automatically locks into place whenever a user manipulates the slipover tank stabilizer in position at the base of a cylinder. Compression spring 643 forces wedged collet 642 downward within opposing ramped channel 644, which is formed within barrel 612 of the slipover tank stabilizer. In so doing, the teeth on wedged collet 642 are forced inward toward the cylinder and resist against any unwanted upward movement of the slipover tank stabilizer on the cylinder. Should upward pressure be applied to the slipover tank stabilizer, from, for instance, the cylinder being tilted, opposing ramped channel 644 would further force the teeth on wedged collet 642 inward toward the cylinder. Wedge-type collet 640 is released while removing the slipover tank stabilizer from the cylinder by grasping ring 641, thereby applying upward pressure on wedged collet 642 and against compression spring 643.

FIGS. 7A to 7C are pictorial diagrams illustrating a second type of anti-slip mechanism, a cam-type lock, in accordance with exemplary embodiment of the present invention. Cam-type lock 740 is an example of an active type of anti-slip mechanism that binds teeth 742 on cam 746 against the outer wall of the cylinder. Cam-type lock 740 is locked in place by the user exerting upward force on ring 741. Note that cam 746 is rotatably joined to barrel 712 by screw 747 thereby allowing cam 746 and teeth 742 to rotate inward toward the outer cylinder wall. Teeth 742 contact the cylinder wall and bind the slipover tank stabilizer in position with respect to the cylinder. Again, should the cylinder be tilted an amount which applies upward pressure to the slipover tank stabilizer, the weight of the cylinder on teeth 742 will force cam 746 to rotate further inward on the cylinder, thereby tightening cam-type lock 740 even more. The slipover tank stabilizer is removed by merely applying downward pressure on ring 741, from there the slipover tank stabilizer can be removed without teeth 742 binding on the cylinder. Due to the extreme forces exerted on both the wedge-type collet and cam-type lock types of anti-slip mechanisms, it is necessary to fashion both from high strength steel or equivalent.

Figure 8B:
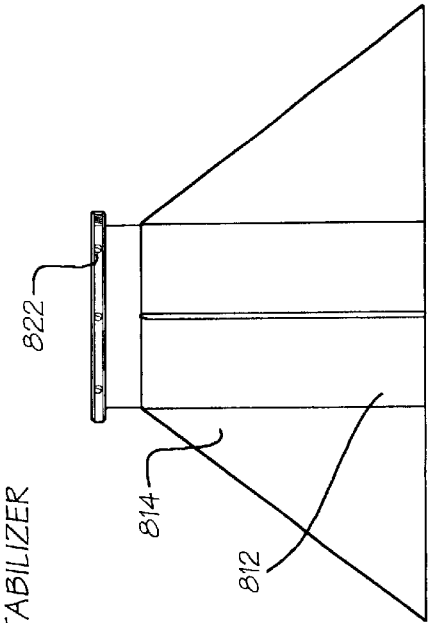
FIGS. 8A–8C are diagrams illustrating three similar slipover tank stabilizers which depict other anti-slip mechanisms in accordance with an exemplary embodiment of the present invention.
Figure 8A:
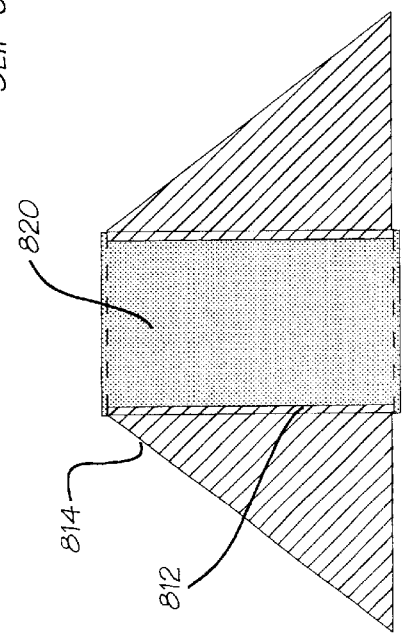
Figure 8C:
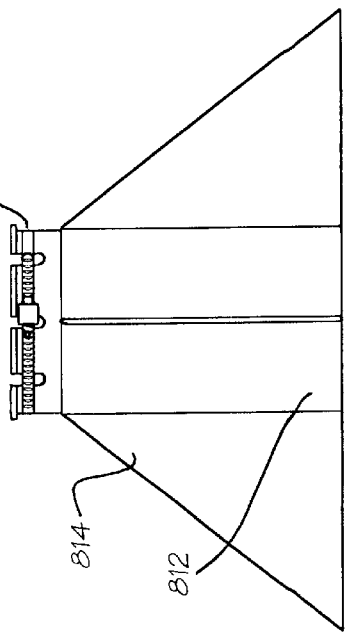

FIGS. 8A–8C are diagrams illustrating three similar slipover tank stabilizers which depict other anti-slip mechanisms in accordance with an exemplary embodiment of the present invention. FIG. 8A illustrates a slipover tank stabilizer having barrel 812 and outriggers 814 and further comprises interior liner 820. Interior liner 820 provides an anti-slip functionality to barrel 812 via friction resistance base on the composition of the liner. In an exemplary composition, liner 820 is a pliable material with a high coefficient of friction, such as rubber, certain plastics, abrasive or anti-skid adhesives, sand paper, etc. Liner 820 is also considered to be a passive anti-slip mechanism because the liner needs no intervention by the user to be effective. FIGS. 8B and 8C, on the other hand, are consider to be active passive anti-slip mechanisms because each requires minimal intervention by the user to be effective. FIG. 8B depicts a slipover tank stabilizer having barrel 812 and outriggers 814 and which further comprises setscrews 822 that can be tightened against the exterior of a cylinder by a user. Setscrews 822 are depicted in FIG. 8B as recessed setscrews but might instead consist of a one-piece screw shaft and exposed torque handle that can be adjusted by a user without the aid of an adjustment tool, thus providing a convenient means of tightening screw 822. Once tightened, the slipover tank stabilizer is securely fastened to the base of the cylinder until the user loosens the screws and moves the slipover tank stabilizer. While barrel 812 and outriggers 814 may be fabricated from any of the above-mentioned materials, it is expected that set screws 822 and the threaded hole are high strength steel for resisting stripping. FIG. 8C depicts a similar slipover tank stabilizer to that shown in FIG. 8B, having barrel 812 and outriggers 814, but which further comprises clamp 826. Clamp 826 is similar to any adjustable clamp in that it provides a means to apply a force radially inward on the cylinder and thereby thus tightening the barrel against the exterior of a cylinder. Here clamp 826 is shown as a common hose clamp but other clamping mechanisms will suffice, for instance a snap ring, nylon tie, etc. Here again the screw portion may consist of an exposed screw head or might instead have a permanently connected handle for ease of tightening without the aid of a screwdriver.

Up to this point, each slipover tank stabilizer described consists of an open-ended barrel and a plurality of outriggers that are attached to the barrel and which extend radially outward, thereby increasing a cylinder's stability by increasing the effective base of the cylinder. However, in some configurations outriggers have the disadvantage of tending to shift laterally at their distal ends and thereby decreasing the effective base and the stability of the cylinder. Individual outriggers have the further disadvantage of reduced effective base, and therefore reduced stability, by increased outrigger spacing. The fewer number of equally spaced outriggers on a stabilizer, the lower the added stability. Still further, individual outrigger configurations have the disadvantage of having only a finite number of contact points with the floor surface, usually at the distal end of each outrigger. In conditions where the floor surface is uneven, one or more outriggers may not contact the floor surface. The maximum tip angle is only realized when each outrigger is securely in contact with the floor surface, thereby preventing the cylinder from rocking. The aforementioned shortcomings are eliminated by configuring the stabilizer in a horizontal base configuration.

Figure 9A:
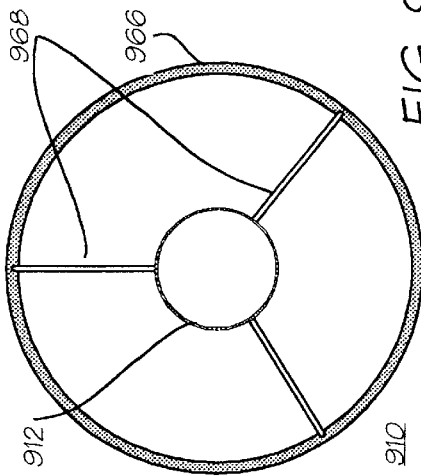
FIGS. 9A–9D are pictorial representations of slipover tank stabilizers configured in a horizontal stabilizer configuration in accordance with a preferred embodiment of the present invention.
Figure 9B:
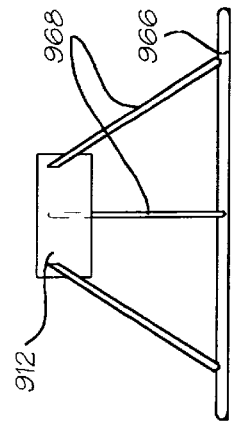
Figure 9C:
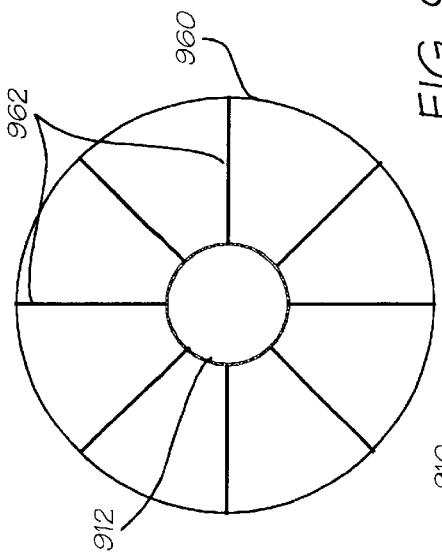
Figure 9D:
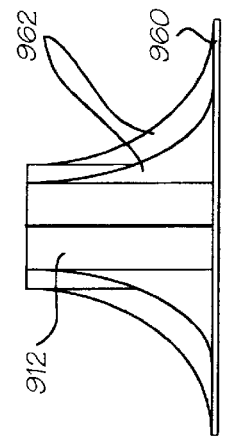

FIGS. 9A–9D are pictorial representations of slipover tank stabilizers configured in a horizontal base configuration in accordance with a preferred embodiment of the present invention. FIGS. 9A and 9B are pictorial representations of slipover tank stabilizer 910 with horizontal plate 960. Horizontal plate 960 is attached to the base of barrel 912 whereby horizontal plate 960 rests against the floor surface when slipover tank stabilizer 910 is in position on the cylinder. Of course, an opening is fashioned into horizontal plate 960 approximately equal to the size of the barrel opening for deploying the stabilizer over a cylinder. Supports 962 may also be added for strengthening horizontal plate 960 if needed. Slipover tank stabilizer 910 which includes horizontal plate 960 maybe fashioned from any of the above mentioned materials. FIGS. 9C and 9D are pictorial representations of slipover tank stabilizer 910 with horizontal ring 966. Horizontal ring 966 is connected to barrel 912 via ring support members 966. When deployed, horizontal ring 966 rests against the floor surface in a similar fashion as the horizontal plate described above. Notice that barrel 912 is much shorter in horizontal ring configuration than in other configuration because ring support members 966 provide a more uneven, binding force against the cylinder wall than other exemplary embodiments described above. It is expected that slipover tank stabilizer 910 which includes horizontal ring 966 is substantially comprised of medium strength steel or other similar metals due to the extreme forces exerted on support members 966 and barrel 912.

Figure 10A:
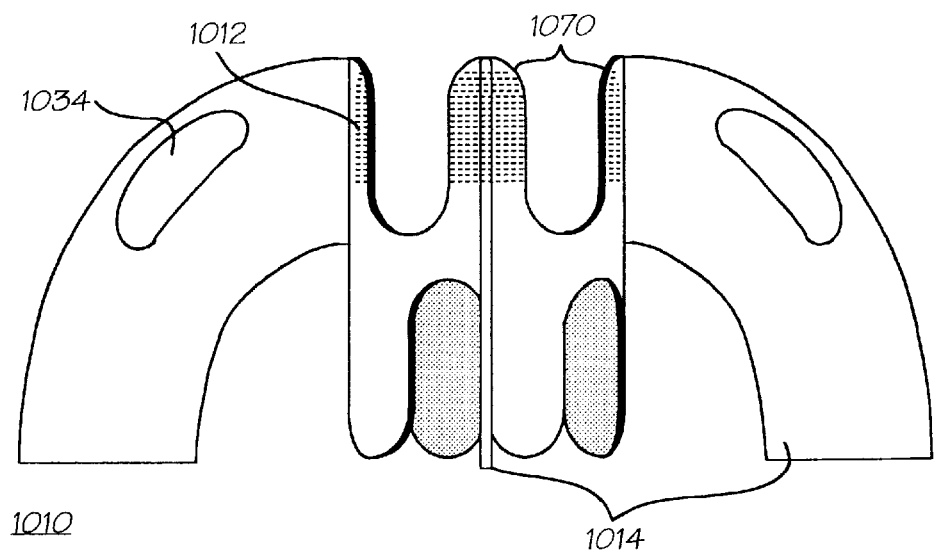
FIGS. 10A and 10B are pictorial representations of flexible finger, self locking, stackable, slipover tank stabilizer in accordance with a preferred embodiment of the present invention.
Figure 10B:
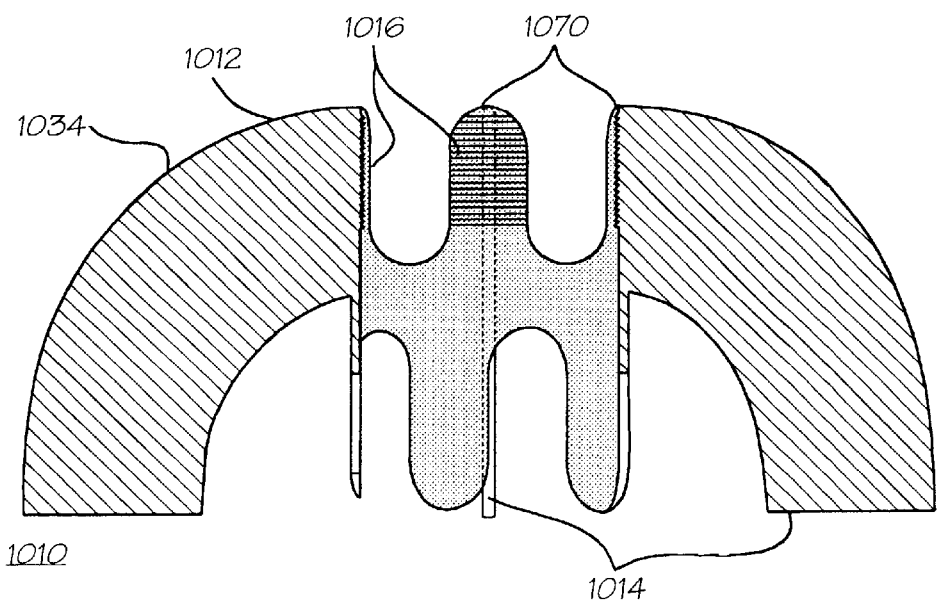

FIGS. 10A and 10B are pictorial representations of flexible finger, self locking, stackable, slipover tank stabilizer in accordance with a preferred embodiment of the present invention. It is presumed that in many instances, especially during transportation, that the slipover tank stabilizers would be transported separate from the compressed gas cylinders, in order to more efficiently stack the cylinders. In those case's providing space for a corresponding number of slipover tank stabilizers may pose a problem. Flexible finger, self locking, stackable, slipover tank stabilizer 1010 reduces the need for storage space by providing stackable, interlocking fingers 1070 which interlock with adjacent fingers on adjoining slipover tank stabilizers. In addition, flexible finger, self locking, stackable, slipover tank stabilizer 1010 includes anti-slip teeth 1012 on the upper portion of the inferior surfaces of fingers 1070 which reduce upward slippage. Unlike previously described stabilizers, flexible finger, self locking, stackable, slipover tank stabilizer 1010 is formed by molding a high impact plastic, acrylic or composite material. These materials allow flexible finger, self locking, stackable, slipover tank stabilizer 1010 to remain resilient and retain its precise shape. Fingers 1070 bow slightly inward toward the cylinder providing a slight tension on anti-slip teeth 1012 toward the cylinder. Outriggers 1014 provide a complementary bias on anti-slip teeth 1012 whenever upward force is exerted on the outriggers. Notice that unlike other outriggers, outriggers 1014 are attached only and the upper fingers 1070 of barrel 1012. This arrangement causes upward forces from the lower portion of the outriggers to cantilever inward on individual fingers 1070. While this arrangement lends itself to eliminating unwanted slippage, removal of flexible finger, self locking, stackable, slipover tank stabilizer 1010 can sometimes be problematic because of the natural bias toward the cylinder. In order to facilitate removal of the aforementioned stabilized, handholds 1034 are present on each outrigger for spreading fingers 1070 away from the cylinder and allowing flexible finger, self locking, stackable, slipover tank stabilizer 1010 to move freely up the tank.

Figure 11A:
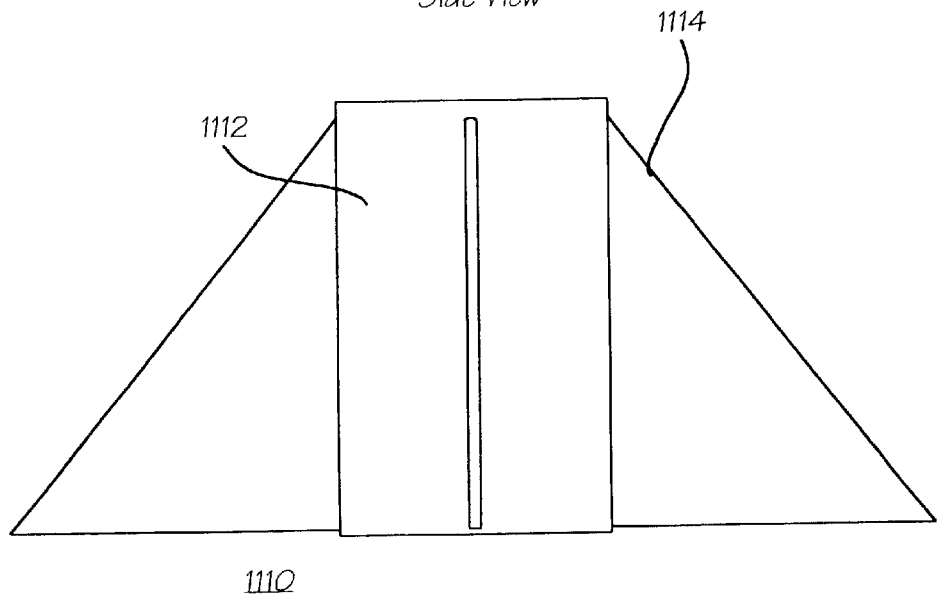
Figure 11B:
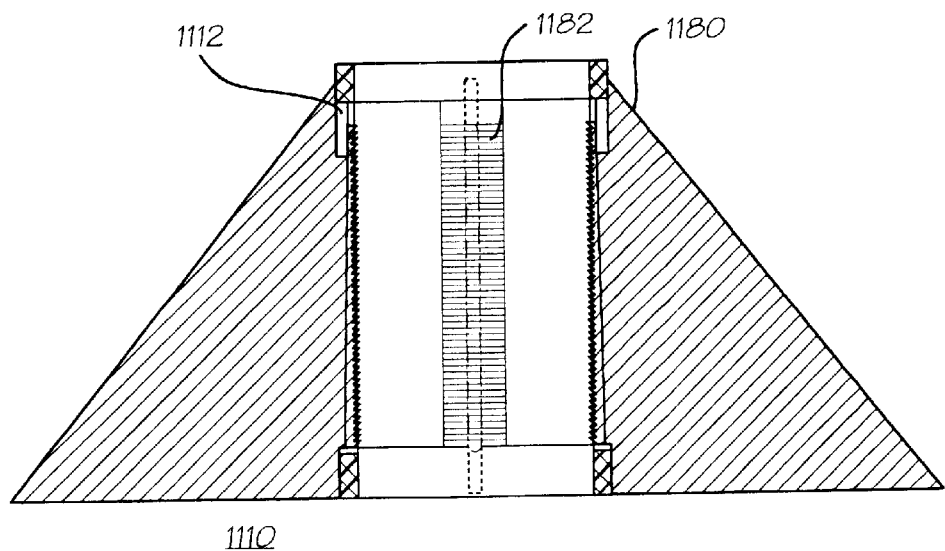

In accordance with other exemplary embodiments, the slipover tank stabilizer is comprised of self locking, wedge-type fin stabilizer which cooperate with the barrel to prevent the stabilizer from riding up on the cylinder. FIGS. 11A–11F are pictorial representations of various aspects of a slipover tank stabilizer comprised of a plurality of self locking, wedge-type fin stabilizers in accordance with an exemplary embodiment of the present invention. FIG. 11A depicts a side view of the exemplary slipover tank stabilizer 1110 including barrel 1112 and outriggers 1114, which are of the self locking, wedge-type fin design. One feature of self locking, wedge-type fins, unlike previously described outrigger configurations, is that the present fin is slidablly interlocked with barrel 1112, in a similar manner as described above with respect to wedge-type collet 640 anti-slip mechanism shown in FIGS. 6A–6C above. In the present embodiment, rather than having a passive type of anti-slip mechanism with exposed ring 641 affixed to wedged collet 642, the exposed portion of the anti-slip mechanism of stabilizer 1110 in FIG. 11 is outrigger 1114, as will become apparent with the description of the following figures. Similarly with wedge-type collet 640 described above, slipover tank stabilizer 1110 with self locking, wedge-type fins is a passive type anti-slip mechanism requiring little or no effort from a user to prevent the stabilizer from riding up on a cylinder.

FIG. 11B is a pictorial representation of a cross sectional cut away view of an exemplary embodiment of a slipover tank stabilizer with self locking, wedge-type fins in accordance with a preferred embodiment of the present invention. Notice that each fin is composed of fin portion 1180 and wedge-type collet 1182. Barrel 1112, in addition to having openings for receiving a cylinder, has vertical slots for receiving individual fin portions 1180. Each vertical slot is slightly larger than the traveling portion of outrigger 1114 to allow for vertical movement within barrel 1112 that results in the wedge-type fin binding or locking against the exterior surface of a cylinder. Notice also that each wedge-type collet 1182 has interior facing teeth for gripping the exterior wall of a cylinder.

As can be seen from FIGS. 11C to 11H, much of the design of slipover tank stabilizer comprised of a plurality of self locking, wedge-type fin stabilizers borrows from the wedge-type collet 640 anti-slip mechanism shown in FIGS. 6A–6C above. FIG. 11C is a cut-away side view of barrel 1112, which shows vertical slots 1186 and opposing wedged channel 1184 which is formed within the interior wall of barrel 1112. Notice that opposing wedged channel 1184 is thicker on its upper end and thinner on its lower end within barrel 1112. FIG. 11D and E show vertical slot 1186 and opposing wedged channel 1184 from an outer and inner view of barrel 1112, respectively. Turning to FIGS. 11F–11H, pictorial representations of outrigger 1114 are depicted in top, cutaway side and bottom views, respectively. Here, in contrast with opposing wedged channel 1186, wedge-type collet 1182 is thicker at the bottom and thinner at the top. By opposing the angled wedges on collet 1182 and channel 1184, the teeth on collet 1182 are forced into the outer surface of a cylinder whenever an upward force is applied to outrigger 1114. Although not shown in the figure, the lower base of outriggers 1114 is expected to hang slightly below the lower opening of barrel 1112, which facilitates locking because the upward force needed for locking is applied by merely positioning slipover tank stabilizer 1110 on a cylinder. When outriggers 1114 contact the floor surface, locking is automatic. However, unlocking may pose a problem in certain circumstances, therefore, although not shown in the figures, an upper lip or handholds may be included on barrel 1112 to give a user a sufficient gripping surface to unlock the stabilizer. It is expected that slipover tank stabilizer 1110 may be comprised of any of the materials listed above. However, because the potential exists for outriggers 1114 to wobble inside vertical slot 1186, a minimum of four outriggers is suggested for this particular configuration. Outriggers 1114, themselves may be made from any material but high impact plastic, acrylic or composite materials provide an efficient cost benefit tradeoff because although synthetic materials may not have the life expectancy of steel, their cost is low. Additionally, unlike some previously described embodiment, only defective outriggers need be replaced-which can be accomplished with a minimum amount of time and effort.

Figure 12A:
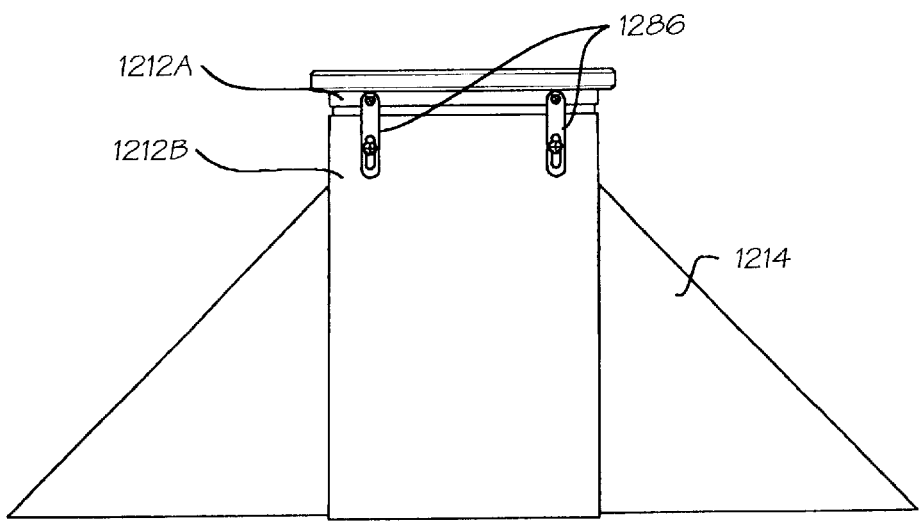
FIGS. 12A and 12B are pictorial representations of another anti-slip mechanism which incorporates a self locking, two-piece interlocking collet barrel in accordance with an exemplary embodiment of the present invention.
Figure 12B:
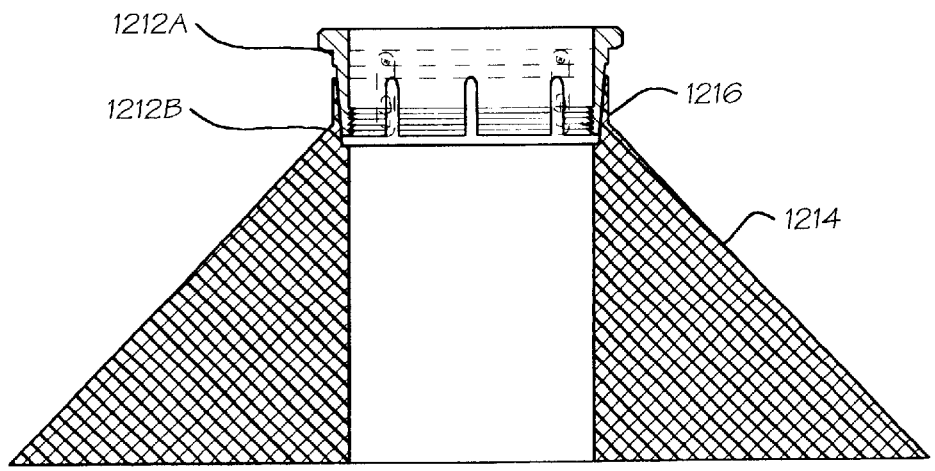

FIGS. 12A and 12B are pictorial representations of another anti-slip mechanism which incorporates a self locking, two-piece interlocking collet barrel in accordance with an exemplary embodiment of the present invention. Similar to slipover tank stabilizer 1110 with self locking, wedge-type fins described above in FIGS. 11A–11H, self locking, two-piece interlocking collet barrel 1212 is a passive type anti-slip mechanism requiring little or no effort from a user to prevent the stabilizer from riding up on a cylinder. Here, upper barrel portion 1212A has a plurality of toothed collets that are tapered inward, oriented in the downward direction. Lower barrel portion 1212B has an outward tapered landing sleeve at its upper end for receiving the tapered collets of upper barrel portion 1212A. Outriggers 1214 are attached to only lower barrel portion 1212B. Retainers 1286 keep upper barrel portion 1212A proximate to lower barrel portion 1212B. The barrel portions are locked to a cylinder by merely deploying the stabilizer on at the base of the cylinder. An upper lip is provided as a handhold for gripping during unlocking.

As discussed above, it is expected that each compressed gas cylinder for an enterprise will have a slipover stabilizer available to it, although not always deployed on the cylinder. The accumulation of large quantities of stabilizes might require an inordinate amount of storage space and therefore be disadvantageous for the enterprise. In an effort to relieve the space requirement, as well as providing a slipover stabilizer with improved maintenance characteristics, a slipover stabilizer is presented. FIGS. 13A–13D are pictorial representations of views of a slipover stabilizer with interlocking fins in accordance with an exemplary embodiment of the present invention. With respect to the present exemplary embodiment, the stabilizer is comprised of separate interlocking fin panels 1390 which join together at seams 1391 to form a barrel and fin assembly similar to those described above. However, here, each interlocking fin panels 1390 has both a male slide assembly 1393 and a female slide assembly 1392 at the connecting edges of interlocking fin panel 1390 which form the barrel when assembled. Panels merely slide together with one another. Once assembled the interlocking fin stabilizer may be used in a manner described above to provide added stability to a cylinder.

Figure 14A:
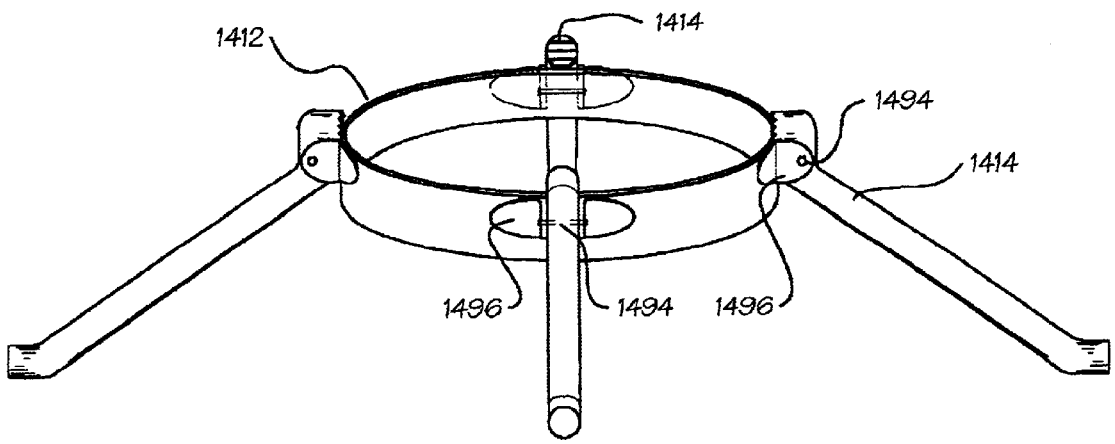
FIGS. 14A–14B are pictorial representations of views of a slipover stabilizer with hinged outriggers in accordance with an exemplary embodiment of the present invention.
Figure 14B:
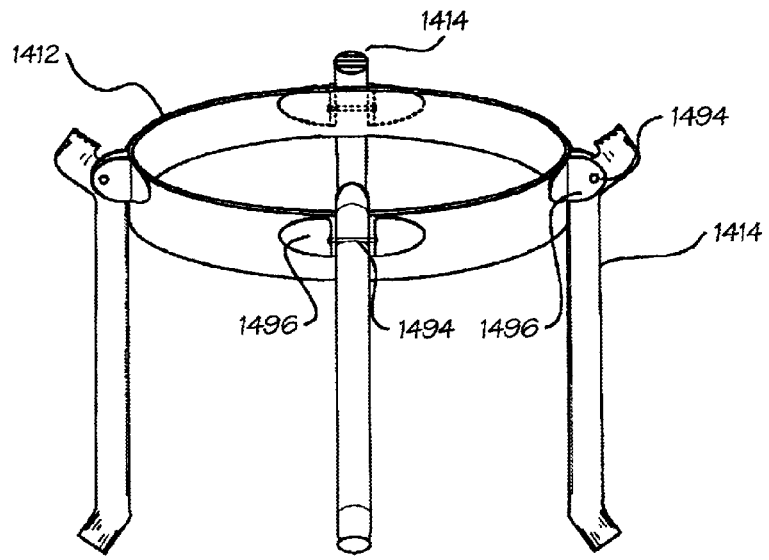

With respect to storing cylinders, it is advantageous to stack multiple cylinders in a vertical or upright orientation and in groups for storage. Within these groups of cylinders, cylinders on the interior of the group have four points of contact with surrounding cylinders. While the above described slipover tank stabilizers have the advantages of stabilizing individual cylinders, they have the disadvantage of having to be removed prior to stacking cylinders in groups for storage. In an effort to relieve the users from the task of completely removing each slipover stabilizer prior to stacking cylinders for storage, a slipover tank stabilizer with hinged outriggers is presented. FIGS. 14A–14B are pictorial representations of views of a slipover stabilizer with hinged outriggers in accordance with an exemplary embodiment of the present invention. With respect to the present embodiment, barrel 1412 is a shorter ring-like barrel with pairs of pin receivers 1496 securely fastened to, or incorporated in barrel 1412. Each pair of pin receivers 1496 is separated by the approximate width, or diameter, of outriggers 1414 and has openings for receiving pins 1496. In accordance with an exemplary embodiment of the present invention outriggers 1414 function as a lever with pin 1496 inserted through the outrigger's body at the fulcrum. Outriggers 1414 have a particular shape for providing stability and anti-slip functionality, while still allowing the outrigger to completely close along the body of a cylinder, shown herein in FIG. 14B. Here the outriggers are shown as being fabricated from a round stock material, but may instead be formed from other stock shapes. In their deployed positions show in FIG. 14A, outriggers 1414 make contact with the exterior side of a cylinder at the surface of the upper end and then form a right angle downward between opposing pin receivers 1496, where pin 1494 is inserted through the outrigger's body at the fulcrum. The outrigger body then continues away from the cylinder at a downward angle for a predetermined distance, that distance determines the effect base. Teeth are scored into outrigger 1414's upper end to reduce slippage between the cylinder and the slipover stabilized.

The slipover tank stabilizer with hinged outriggers is deployed by merely sliding or dropping the stabilizer around a cylinder. If outriggers 1414 do not fully open, the user merely pulls the distal end of any outriggers not fully opened. Removing the slipover tank stabilizer merely entail lifting the stabilizer off of the tank. Unlike previously described stabilizers, barrel 1412 in the present embodiment is primarily provided for structural integrity and does not afford a significant anti-slip benefit, therefore barrel 1412 may be loosely fit to the cylinder's diameter. Coil springs may also be provided for each outrigger in order to maintain outriggers 1414 in the closed position when not deployed. The collapsible feature of outriggers 1414 is highly advantageous when cylinders are stacked in storage. Because each outrigger collapses closed to only a fraction of its open length, slipover tank stabilizers with hinged outriggers may be left on stacked cylinders by orienting the closed outriggers between contact points of the group of cylinders. When gas cylinders are arranged with four contact points between cylinders, four spaces are also created between cylinders in the group, the closed outriggers are positioned in those spaces. Thus, when using the four contact point cylinder stacking arrangement, a stabilizer should have four hinged outriggers in order to take advantage of spaces in the cylinder stacking arrangement.

FIGS. 15A–15B are pictorial representations of views of a spin-on slipover stabilizer in accordance with an exemplary embodiment of the present invention. FIG. 15A shows spin-on stabilizer 1510 in the open or deployed position, while FIG. 15B shows spin-on stabilizer 1510 in the retracted or closed position. Spin-on stabilizer 1510 departs from the aforementioned exemplary slipover stabilizers in that spin-on stabilizer 1510 takes advantage of the threaded neck on a cylinder for its anti-slip control. The barrel of spin-on stabilizer 1510 is divided in the exemplary embodiment into upper spin-on neck barrel 1512A and lower slipover barrel 1512B. Outriggers 1514 are hinged to upper spin-on neck barrel 1512A and also hinged to cross members 1515, which are, in turned, hinged at their opposite ends to lower slipover barrel 1512B.

In practice, lower slipover barrel 1512B is slid over tank 1500 until spin-on neck barrel 1512A contacts the threaded neck of tank 1500. From that point, spin-on stabilizer 1510 is spun or threaded onto tank 1500, thereby threading spin-on neck barrel 1512A to the outer threads of the neck of tank 1500. Once spin-on stabilizer 1510 is securely threaded onto tank 1500, lower slipover barrel 1512B can be slipped of tank 1500 causing each of cross members 1515 to force each of outriggers 1514 outward, away from tank 1500. Each of cross members 1515 is fitted with a horizontal stop (not shown) that constricts the position of lower slipover barrel 1512B to an approximate horizontal co-plane plane with the cross members 1515, thus contravening each of outriggers 1514 is in its outwardly most extended position. After spin-on stabilizer 1510 has been positioned on tank 1500, protective cap 1502 may be threaded onto the remaining exposed threads on the neck of tank 1500, thereby further protecting valve and stem assembly 1506.

Outriggers 1514 can be manipulated inward to a position approximately parallel to the side of tank 1500, as shown in FIG. 15B, by forcing lower slipover barrel 1512B upward along tank 1500. Each outrigger 1514 is fitted with a length adjustment means for adjusting outrigger length to accommodate opening and closing outriggers 1514 as well as uneven floor surfaces. In the exemplary embodiment the length adjustment means is telescoping outriggers which are locked using telescoping outrigger locks 1513.

In the exemplary embodiment three individual outriggers are shown but those of ordinary skill in the art would understand from this teaching that any number of outriggers may be used above three. Also, for additional protection against accidental toppings, spin-on neck barrel 1512A may be combined on or with spin-on valve protector 430 show in FIGS. 4A–4C. Still further, slipover barrel 1512B and cross members 1515 may be eliminated from spin-on stabilizer 1510 in embodiments where spin-on neck barrel 1512A comprises a means for constraining outriggers 1514 to the maximum extension. Of course, in this embodiment in might be necessary to strengthen both spin-on neck barrel 1512A and outriggers 1514.

In an effort to offer users even more convenience for handling compressed gas cylinders, wheels may be incorporated on the outer extents of outriggers in order to aid in transporting cylinders. Normally a user must located a dolly or hand truck, secure the cylinder onto the dolly, relocate the cylinder and then return the dolly from wherever it came. The present invention greatly diminishes this task by providing a semi-permanent transport means. FIGS. 16A–16C are pictorial representations of views of a slipover stabilizer with dolly wheels in accordance with an exemplary embodiment of the present invention. Slipover stabilizer 1610 may be any of the solid barrel, secure outrigger stabilizer embodiments discussed above that positively lock to the cylinder, such as with set screws or clamps shown in FIGS. 8B and 8C. At the distal end of at least two adjacent outriggers 1614, dolly wheels 1698 are affixed by means of axle 1699, for instance. Dolly wheels 1698 are positioned on the outrigger such that the wheels do not contact the floor surface within the tip angle for the particular stabilizer, to do so would decrease the tip angle and reduce the stability of the cylinder. A user merely tips the cylinder onto dolly wheels 1698 and then moves the cylinder as though it was on a hand truck. Convenient handholds for moving are available by spin-on valve protector 430, shown in FIGS. 4A–4C, which could be used in conjunction with a protective cap during movement. While FIGS. 16A–16C depict fin-type outriggers, horizontal ring or horizontal plate stabilizers, as shown in FIGS. 9A–9D, could also accept dolly wheels 1698.

The description of the present invention has been presented for purposes of illustration and description but is not intended to be exhaustive or limited to the invention in the form disclosed. Many modifications and variations will be apparent to those of ordinary skill in the art. For example, the vertical heights of barrel and outrigger may vary from the exemplary embodiments without departing from the scope of the present invention. Ordinary artisans would readily realize that a number of different materials might be used in the construction of the present invention. Also, various anti-slip mechanisms may be employed in view of the present disclosure without departing from the intent of the present invention. In another example, while the present invention has been most often referred to within with respect to a pressurized tank or cylinder, many of the benefits of the present invention may be realized in use with any cylindrically shaped object. The embodiment was chosen and described in order to best explain the principles of the invention and the practical application, and to enable others of ordinary skill in the art to understand the invention for various embodiments with various modifications as are suited to the particular use contemplated.

What is claimed is:

1. A slipover device for stabilizing cylindrically shaped tank in a substantially upright position, said slipover device comprising:

a cylindrically shaped tank, said cylindrically shaped tank having an outer diameter being fitted for holding compressed gases;

a barrel for slipping over said outer diameter of said cylindrically shaped tank while in a substantially upright position and for resisting riding up on said cylindrically shaped tank while cantilevered loading forces are exerted by said cylindrically shaped tank, said barrel comprising:

a first slipover opening, said first slipover opening having a sufficiently large first opening diameter for slipping over said outer diameter of said cylindrically shaped tank, and, said first opening diameter of said first slipover opening having a sufficiently close tolerance to said outer diameter of said cylindrically shaped tank for resisting riding up on said cylindrically shaped tank while cantilevered loading forces are exerted by said cylindrically shaped tank; and a second slipover opening, said second slipover opening having a sufficiently large second opening diameter for slipping over said outer diameter of said cylindrically shaped tank, and, said second opening diameter of said second slipover opening having a sufficiently close tolerance to said outer diameter of said cylindrically shaped tank for resisting riding up on said cylindrically shaped tank while cantilevered loading forces are exerted by said cylindrically shaped tank; and a plurality of outriggers for opposing cantilevered loading forces exerted by said cylindrically shaped tank, each of said plurality of outriggers comprising:

a barrel outrigger end, said barrel outrigger end joined to said barrel; an outrigger body extending from said barrel outrigger end in an approximate radial direction from said barrel;

a distil outrigger end, said distil outrigger end defining an outer extent of said outrigger body, thereby increasing an effective radius of said cylindrically shaped tank while in the substantially upright position; and a contact point proximate to said distil outrigger end, said contact point for contacting a surface for opposing cantilevered loading forces exerted by said cylindrically shaped tank.

2. The slipover device recited in claim 1 above, wherein said cylindrically shaped tank has a valve port at an upper end of said cylindrically shaped tank the slipover device further comprises:
   an upper protector, wherein said upper protector extends radially past the diameter of the valve port and connects to said cylindrically shaped tank using one of threads, fastener, snap ring and clamp.

3. The slipover device recited in claim 1 above, wherein at least one of the plurality of outriggers further comprises:
   a leveling mechanism, said leveling mechanism being vertically adjustable for one of increasing and decreasing a vertical length of said at least one of the plurality of outriggers, thereby providing leveling of said device irrespective of a floor surface level.

4. The slipover device recited in claim 1 above, wherein said barrel further comprises:
   an anti-slip mechanism, said anti-slip mechanism resisting upward movement of said barrel with respect to said cylindrically shaped tank.

5. The slipover device recited in claim 4 above, wherein said anti-slip mechanism being a passive anti-slip mechanism thereby resisting upward movement of said barrel with respect to said cylindrically shaped tank with minimal intervention from a user.

6. The slipover device recited in claim 5 above, wherein said passive anti-slip mechanism further comprises one of binding teeth, friction lining, wedged insert, resilient flexible member and cantilevered outrigger.

7. The slipover device recited in claim 4 above, wherein said anti-slip mechanism comprising one of barrel fastener, manual locking wedge, manual locking cam, manual locking wedged outrigger, two-piece interlocking barrel and threads.

8. The slipover device recited in claim 1 above further comprises:
   a horizontal member, said horizontal member affixed to at least two of said plurality of outriggers whereby said horizontal member provides circumferential contact with a horizontal floor surface.

9. The slipover device recited in claim 8 above, wherein said horizontal member being one of a ring and plate.

10. The device recited in claim 1 above, wherein said barrel further comprises vertical slots, each vertical slot adapted for accepting each of the plurality of outriggers, said barrel further comprising a wedge-shape channel proximate to said each of the vertical slots for opposing a wedge-shaped member disposed on each of the plurality of outriggers.

11. The slipover device recited in claim 1 above, wherein said barrel and said plurality of outriggers are rigidly joined.

12. The slipover device recited in claim 1 above, wherein said barrel comprises a plurality interlocking portions, whereby each of the plurality of outriggers is rigidly fastened to one of said interlocking portions and each interlocking portion of said barrel cooperatively interlocks with each other interlocking portion of said barrel.

13. The slipover device recited in claim 1 above, wherein each of the plurality of outriggers is connected to said barrel via a hinged connection, thereby allowing said barrel outrigger end to close toward said barrel, the slipover device further comprises:
   an outrigger travel stop, said outrigger travel stop restricts upward travel of said distil outrigger end of each of said plurality of outriggers and thereby allowing at least some of said plurality of outriggers to deploy securely on a horizontal floor surface.

14. The slipover device recited in claim 1 above further comprises:
   at least two wheels, each of said wheel being fastened to one of said plurality of outriggers.

15. The slipover device recited in claim 4 above, wherein said anti-slip mechanism being formed by minimizing an orifice between an outer surface of said cylindrically shaped tank and an inner surface of said barrel.

16. The slipover device recited in claim 1 above, wherein said plurality of outriggers comprises at least three outriggers.

17. The slipover device recited in claim 1 above, wherein each of said plurality of outriggers being configured as one of substantially planar, round and tubular.

18. The slipover device recited in claim 1 above, wherein each of the plurality of outriggers is connected to said barrel via a hinged connection, and at least one of the plurality of barrel outrigger ends abuts said barrel.

19. The slipover device recited in claim 18 above, wherein said at least one of the plurality of barrel outrigger ends abutting said barrel is in response to said contact point of a respective outrigger body contacting said surface.

* * * * *